(12) United States Patent
Cevik et al.

(10) Patent No.: US 12,431,300 B2
(45) Date of Patent: Sep. 30, 2025

(54) FLEXIBLE ENERGY STORAGE DEVICE WITH REDOX-ACTIVE BIOPOLYMER ORGANOGEL ELECTROLYTE

(71) Applicant: Imam Abdulrahman Bin Faisal University, Dammam (SA)

(72) Inventors: Emre Cevik, Dammam (SA); Sarah Mousa Maadi Asiri, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 539 days.

(21) Appl. No.: 17/941,750

(22) Filed: Sep. 9, 2022

(65) Prior Publication Data

US 2024/0087819 A1 Mar. 14, 2024

(51) Int. Cl.
| | |
|---|---|
| *H01G 11/02* | (2013.01) |
| *H01G 11/04* | (2013.01) |
| *H01G 11/34* | (2013.01) |
| *H01G 11/56* | (2013.01) |

(52) U.S. Cl.
CPC ............ *H01G 11/02* (2013.01); *H01G 11/04* (2013.01); *H01G 11/34* (2013.01); *H01G 11/56* (2013.01)

(58) Field of Classification Search
CPC ........ H01G 11/02; H01G 11/04; H01G 11/34; H01G 11/56; H01G 11/84
See application file for complete search history.

(56) References Cited

U.S. PATENT DOCUMENTS

| | | | |
|---|---|---|---|
| 4,898,921 A | 2/1990 | Humphrey | |
| 2018/0204688 A1* | 7/2018 | Lim | ........................ H01G 11/86 |
| 2018/0355194 A1* | 12/2018 | Yadavalli | ............... H01G 11/36 |
| 2021/0119254 A1* | 4/2021 | Bozkurt | ............. H01M 10/052 |

FOREIGN PATENT DOCUMENTS

| | | |
|---|---|---|
| CN | 101490541 A | 7/2009 |
| CN | 105513800 B | 5/2018 |
| CN | 112735850 A | 4/2021 |
| CN | 112510209 B | 10/2021 |

OTHER PUBLICATIONS

Monrrabal, et al. ; Design of gel electrolytes for electrochemical studies on metal surfaces with complex geometry ; Electrochimica Acta 220 ; 2016 ; 9 Pages.

(Continued)

*Primary Examiner* — Aiqun Li
(74) *Attorney, Agent, or Firm* — Oblon, McClelland, Maier & Neustadt, L.L.P.

(57) ABSTRACT

A flexible energy storage device with a redox-active biopolymer organogel electrolyte is provided. The flexible energy storage device can include a pair of electrodes separated by the redox-active biopolymer organogel electrolyte. The redox-active biopolymer organogel electrolyte can include a biopolymer organogel, redox-active molybdenum-containing ions, and a secondary ionic substance. The flexible energy storage device may retain greater than 75% of an unbent specific capacitance when bent at an angle of 10° to 170°.

12 Claims, 12 Drawing Sheets

(56) References Cited

OTHER PUBLICATIONS

Pal, et al. ; Fabrication of Flexible, Fully Organic, Degradable Energy Storage Devices Using Silk Proteins ; ACS Appl. Mater. Interfaces 10, 11 ; Feb. 26, 2018 ; Abstract Only ; 2 Pages.
Blin, et al. ; Glycerol-plasticized Agarose separator suppressing dendritic growth in Li metal battery ; Elsevier ; 2020 ; https://www.sciencedirect.com/science/article/pii/S0144861720308717 ; 16 Pages.
Chen, et al. ; Flexible all-solid-state high-power supercapacitor fabricated with nitrogen-doped carbon nanofiber electrode material derived from bacterial cellulose ; Energy & Environmental Science Issue 1 ; 2013 ; Abstract Only ; 1 Page.
Noori, et al. ; Towards establishing standard performance metrics for batteries, supercapacitors and beyond. Chem. Soc. Rev. 48 ; Mar. 4, 2019 ; Abstract Only ; 1 Page.
Anothumakkool, et al. ; Design of a High Performance Thin All-Solid-State Supercapacitor Mimicking the Active Interface of Its Liquid-State Counterpart ; ACS Applied Materials & Interfaces 5 ; 2013 ; 8 Pages.
Cameron, G.G. ; Book review: Polymer electrolytes ; Polymer International vol. 46, No. 1 ; 1998 ; 1 Page.
Wright ; Polymer electrolytes—the early days ; Electrochimica Acta vol. 43, No. 10-11 ; 1998 ; Abstract Only ; 3 Pages.
Tănase, et al. ; Biopolymers based on renewable resources—a review ; Scientific Bulletin. Series F. Biotechnologies, vol. XVIII ; 2014 ; 8 Pages.
Rayung, et al. ; Bio-Based Polymer Electrolytes for Electrochemical Devices: Insight into the Ionic Conductivity Performance ; Materials (Basel) 13(4) ; Feb. 2020 ; 62 Pages.
Zucca, et al. ; Agarose and Its Derivatives as Supports for Enzyme Immobilization ; Molecules 21(11) ; Nov. 2016 ; 34 Pages.
Normand, et al. ; New Insight into Agarose Gel Mechanical Properties ; Biomacromolecules 1(4) ; 2000 ; Abstract Only ; 1 Page.
Koo, et al. ; Aqueous soft matter based photovoltaic devices ; Journal of Materials Chemistry 21(1) ; Dec. 2010 ; Abstract Only ; 10 Pages.
Guo, et al. ; Agar-based porous electrode and electrolyte for flexible symmetric supercapacitors with ultrahigh energy density ; Journal of Power Sources, vol. 507 ; Sep. 30, 2021 ; Abstract Only ; 4 Pages.
Fang, et al. ; Skin-Inspired Surface-Microstructured Tough Hydrogel Electrolytes for Stretchable Supercapacitors ; ACS Applied Materials & Interfaces 11 ; 2019 ; 9 Pages.
Moon, et al. ; A Biodegradable Gel Electrolyte for Use in High-Performance Flexible Supercapacitors ; ACS Appl. Mater. Interfaces 18(7) ; Feb. 18, 2015 ; Abstract Only ; 1 Page.
Raphael, et al. ; Agar-based films for application as polymer electrolytes ; Electrochimica Acta vol. 55, Issue 4 ; Jan. 25, 2010 ; Abstract Only ; 3 Pages.
Menzel, et al. ; Agar-based aqueous electrolytes for electrochemical capacitors with reduced self-discharge ; Electrochimica Acta vol. 332 ; Feb. 1, 2020 ; 34 Pages.
Cevik, et al. ; Bio-inspired redox mediated electrolyte for high performance flexible supercapacitor applications over broad temperature domain ; J. Power Sources 474 ; 2020 ; 21 Pages.
Railanmaa, et al. ; Non-toxic printed supercapacitors operating in sub-zero conditions ;Scientific Reports 9 ; Oct. 1, 2019 ; 24 Pages.

* cited by examiner

FIG. 3C.
FIG. 3D.
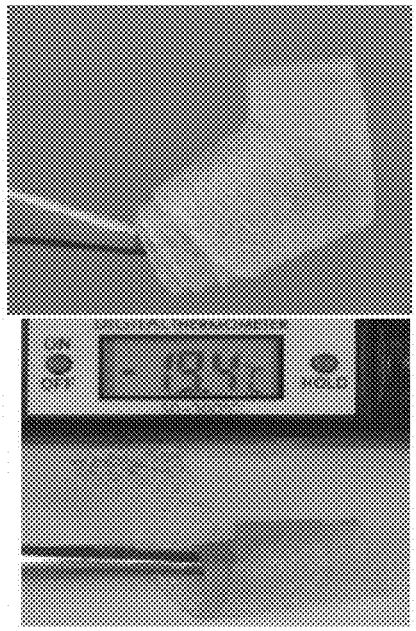
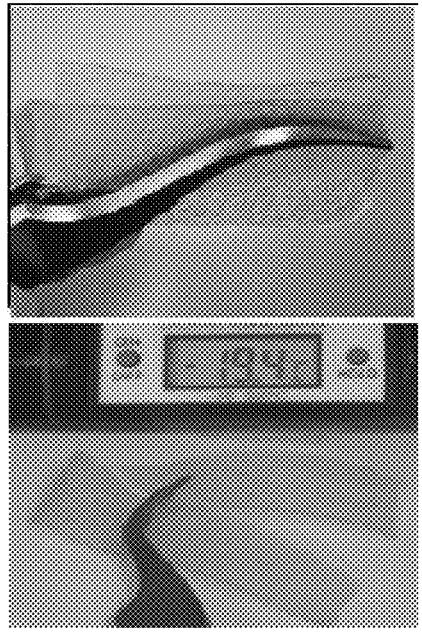

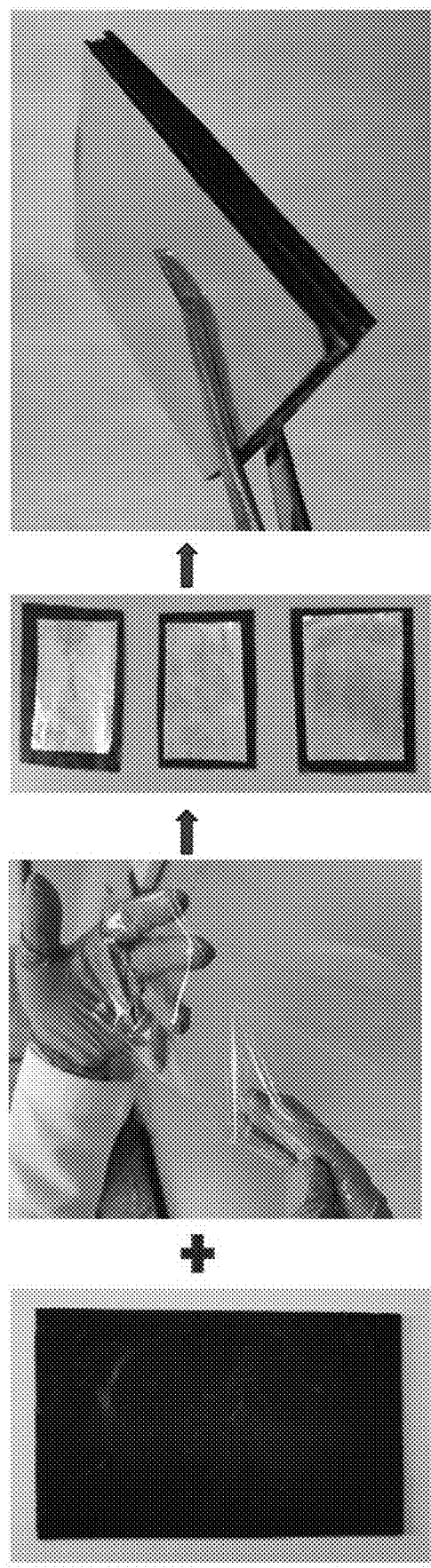
FIG. 4.
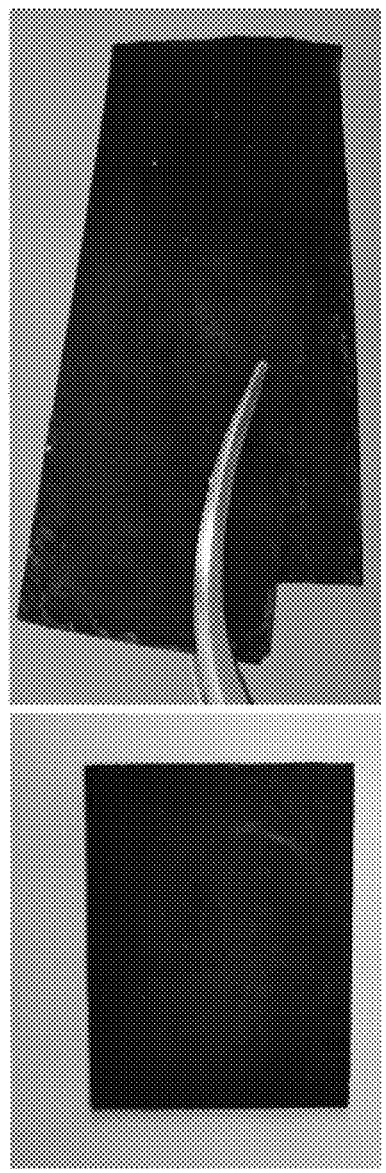
FIG. 5B.
FIG. 5A.

FLEXIBLE ENERGY STORAGE DEVICE WITH REDOX-ACTIVE BIOPOLYMER ORGANOGEL ELECTROLYTE

BACKGROUND OF THE INVENTION

Field of the Invention

The present disclosure relates to flexible energy storage devices. More specifically, the present disclosure relates to supercapacitors including electrodes and a redox-active biopolymer organogel electrolyte. The biopolymer organogel electrolyte contains a biopolymer organogel, containing a biopolymer gelator, a gel solvent, redox-active molybdenum-containing ions, and a secondary ionic substance.

Discussion of the Background

Energy storage technologies have been developed by introducing flexible energy storage devices for exceptional use, such as wearable electronic devices and foldable mobile devices. Supercapacitors, inter alia, have garnered a lot of focus owing to exceptional features such as long cycle life, fast charge/discharge, high power density, and environmental compatibility. Generally, liquid electrolytes containing different salts or strong acids have been used in supercapacitors with various organic solvents such as ethylene carbonate or propylene carbonate. These electrolyte systems have been extensively applied in electric double layer capacitors (EDLC). However, liquid electrolytes have various disadvantages such as high toxicity, flammability and possible electrolyte leakage that necessitates safe encapsulation, resulting in high cost. To meet such challenges, structurally stable electrolytes have been developed. Polymer electrolytes with better physical properties such as flexibility and conductivity after doping with ion-conducting species have also been advanced.

While supercapacitors can be manufactured using polymer electrolytes, developing supercapacitors with important properties such as ionic conductivity, temperature stability and electrolytes with electrochemical stability properties is still very challenging. One recent solution to remedy the challenges associated with polymer electrolytes is use of redox-mediated systems with high energy and power densities, and high-capacitance. However, such systems are expensive to produce, and exhibit several stability drawbacks. Hence, there is a need for development of practical and highly effective, low-cost electrolytes for applications in flexible energy storage devices.

Accordingly it is one object of the present disclosure to provide flexible energy storage device that uses a redox-active biopolymer organogel electrolyte that retains storage capacity under stress.

SUMMARY OF THE INVENTION

The present disclosure relates to a flexible energy storage device, comprising a pair of electrodes separated by a redox-active biopolymer organogel electrolyte, the redox-active biopolymer organogel electrolyte comprising a biopolymer organogel comprising a biopolymer gelator and a gel solvent, redox-active molybdenum-containing ions, and a secondary ionic substance which is at least one selected from the group consisting of a lithium salt and a sodium salt, wherein the flexible energy storage device retains greater than 75% of an unbent energy storage capacity when bent at an angle of 10 to 170°.

In some embodiments, the biopolymer gelator is agarose.

In some embodiments, agarose is present in the biopolymer organogel in an amount of 2.5 to 50 wt. %, based on a total weight of biopolymer organogel.

In some embodiments, the biopolymer organogel is substantially free of agaropectin.

In some embodiments, the gel solvent is glycerol.

In some embodiments, the glycerol is present in an amount of 50 to 97.5 wt %, based on a total weight of biopolymer organogel.

In some embodiments, the redox-active molybdenum-containing ions are molybdate anions.

In some embodiments, the redox-active molybdenum-containing ions are present in an amount of 0.1 to 15.0 wt. %, based on a total weight of the redox-active biopolymer organogel electrolyte.

In some embodiments, the secondary ionic substance is present in an amount of 1.0 to 20.0 wt. %, based on a total weight of redox-active biopolymer organogel electrolyte.

In some embodiments, the redox-active biopolymer organogel electrolyte has a DC conductivity ($\sigma_{DC}$) of $5.00 \times 10^{-5}$ to $1.00 \times 10^{-3}$ Scm$^{-1}$ at a temperature of 10 to 30° C.

In some embodiments, the redox-active biopolymer organogel electrolyte has an AC conductivity of $2.00 \times 10^{-5}$ to $6.50 \times 10^{-4}$ Scm$^{-1}$ at a frequency of $10^3$ to $10^6$ Hz and a temperature of 10 to 30° C.

In some embodiments, the redox-active biopolymer organogel electrolyte has a maximum dielectric loss at a frequency of $5.00 \times 10^4$ to $5.00 \times 10^4$ Hz at a temperature of 10 to 30° C.

In some embodiments, one or both of the electrodes are carbon electrodes.

In some embodiments, the flexible energy storage device is capable of being twisted and/or bent to an angle of 0 to 180° without breaking, tearing, or ripping at a temperature of −40 to 120° C.

The present disclosure also relates to a method of forming the flexible energy storage device comprising mixing the biopolymer gelator, gel solvent, redox-active molybdenum-containing ions, and secondary ionic substance the redox-active biopolymer organogel electrolyte, disposing the redox-active biopolymer organogel electrolyte on a first electrode such that the redox-active biopolymer organogel electrolyte forms a uniform film covering an entirety of atop surface of the first electrode, and placing onto the redox-active biopolymer organogel electrolyte a second electrode such that the second electrode is separated from the first electrode by the redox-active biopolymer organogel electrolyte to form the flexible energy storage device.

In some embodiments, the first electrode, the second electrode, or both, are carbon electrodes prepared by uniformly depositing on a metal support a film comprising activated carbon, conductive carbon, and a binder such that an entirety of a top surface of the metal support is individually covered by the film to form a carbon electrode.

The present disclosure also relates to a redox-active biopolymer organogel electrolyte, comprising 75 to 98.9 wt. % a biopolymer organogel comprising a biopolymer gelator and a gel solvent, 0.1 to 15.0 wt. % redox-active molybdenum-containing ions, and 1.0 to 20.0 wt. % a secondary ionic substance which is at least one selected from the group consisting of a lithium salt and a sodium salt, each based on a total weight of redox-active biopolymer organogel electrolyte, wherein the redox-active biopolymer organogel electrolyte is capable of being twisted and/or bent to an angle of 0 to 1800 without breaking, tearing, or ripping at a temperature of −40 to 120° C.

In some embodiments, the biopolymer gelator is agarose and is present in an amount of 2.5 to 50 wt. %, based on a total weight of biopolymer organogel, and the gel solvent is glycerol and is present in an amount of 50 to 97.5 wt %, based on a total weight of biopolymer organogel.

In some embodiments, the redox-active molybdenum-containing ions are molybdate anions.

In some embodiments, the redox-active biopolymer organogel electrolyte is substantially free of agaropectin.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3C depicts rolling the redox-active biopolymer organogel electrolyte at room temperature and −20° C.

FIG. 3D depicts bending the redox-active biopolymer organogel electrolyte at room temperature and −20° C.

FIG. 4 shows a schematic depiction of the preparation of a supercapacitor device which includes the redox-active biopolymer organogel electrolyte, according to an embodiment of the present disclosure.

FIG. 5A depicts an exemplary supercapacitor device, according to an embodiment of the present disclosure.

FIG. 5B depicts bending of the supercapacitor device.

DETAILED DESCRIPTION OF THE INVENTION

Figure 1A:
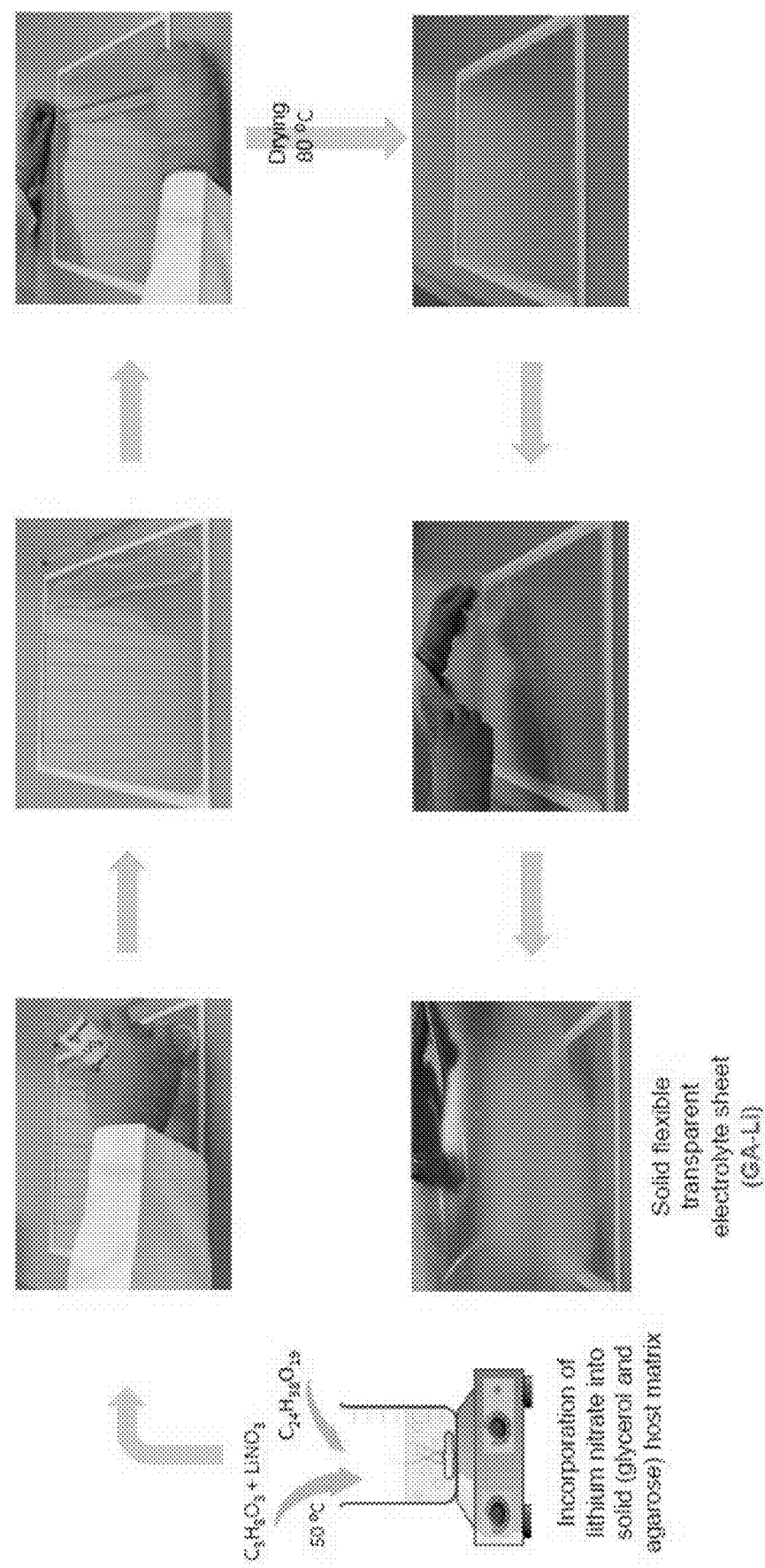
FIG. 1A shows a schematic depiction of the preparation of the redox-active biopolymer organogel electrolyte, according to an embodiment of the present disclosure.
Figure 1B:
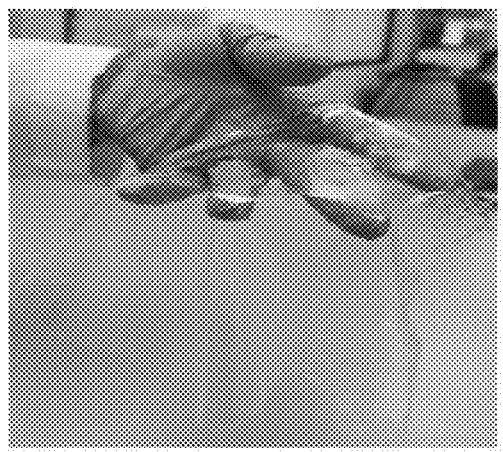
FIG. 1B shows a photograph of a sample of the redox-active biopolymer organogel electrolyte, according to an embodiment of the present disclosure.
Figure 2A:
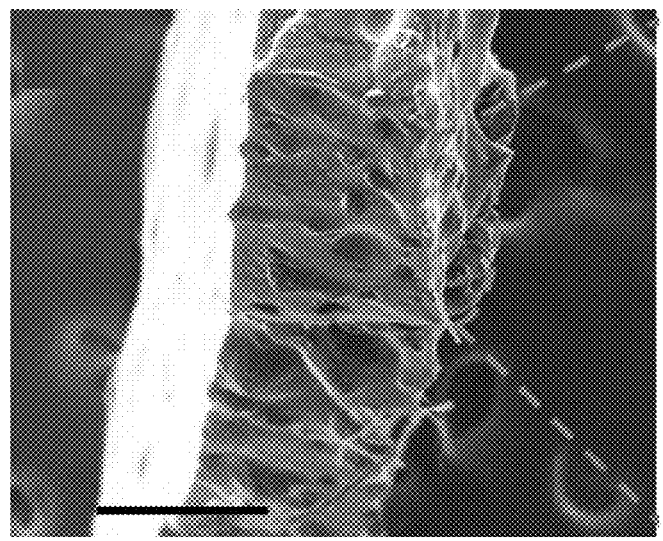
FIGS. 2A-2C are scanning electron microscopy (SEM) images of the redox-active biopolymer organogel electrolyte at various magnifications, according to an embodiment of the present disclosure.
Figure 2B:
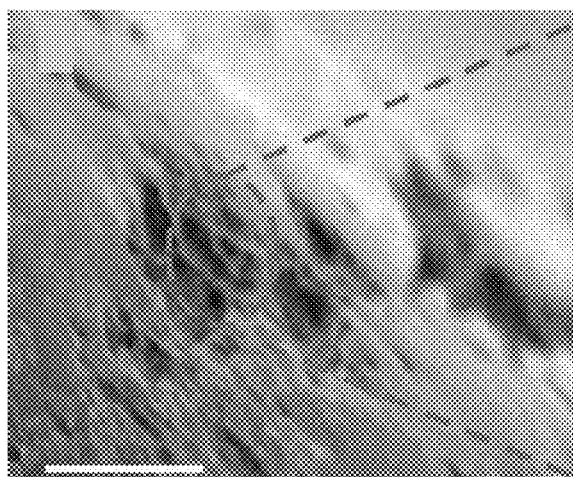
Figure 2C:
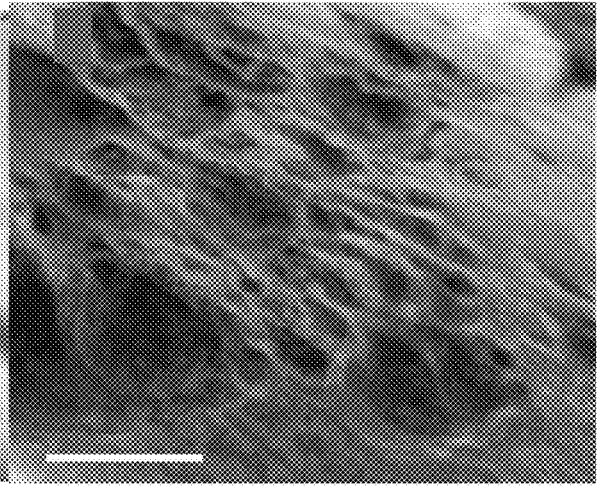
Figure 3A:
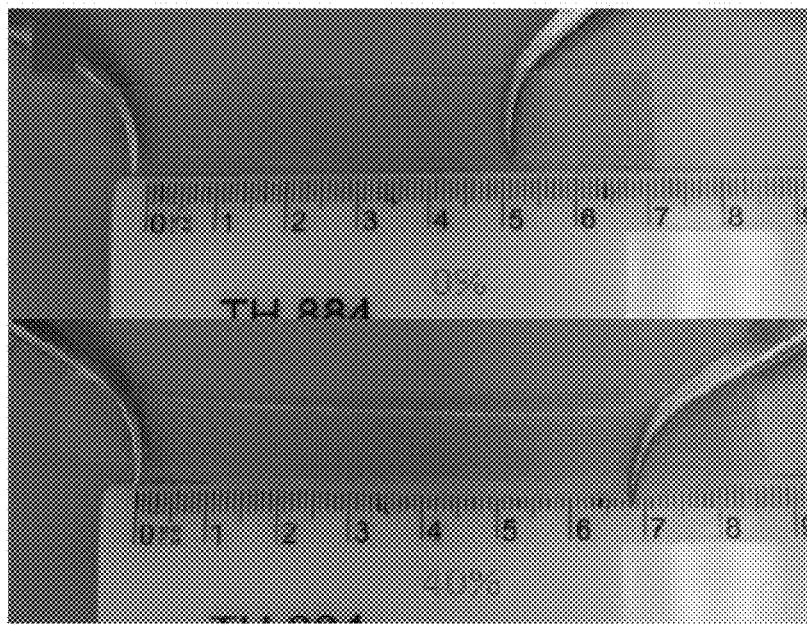
FIG. 3A depicts stretching of the redox-active biopolymer organogel electrolyte.
Figure 3B:
FIG. 3B depicts twisting the redox-active biopolymer organogel electrolyte at room temperature and −20° C.
Figure 5D:
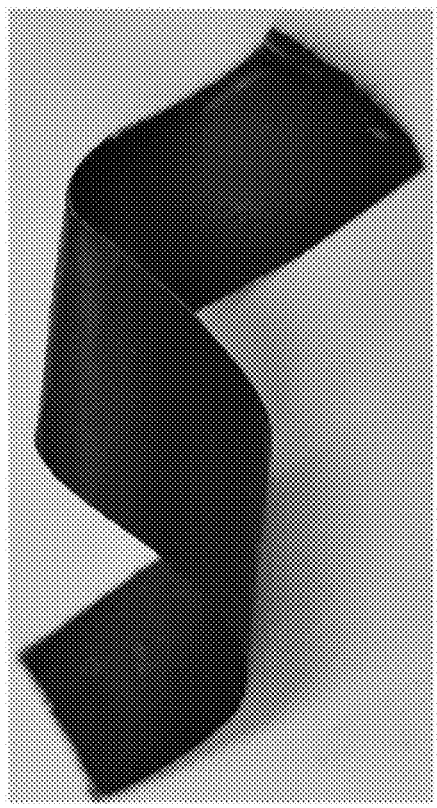
FIG. 5D depicts twisting of the supercapacitor device.
Figure 5C:
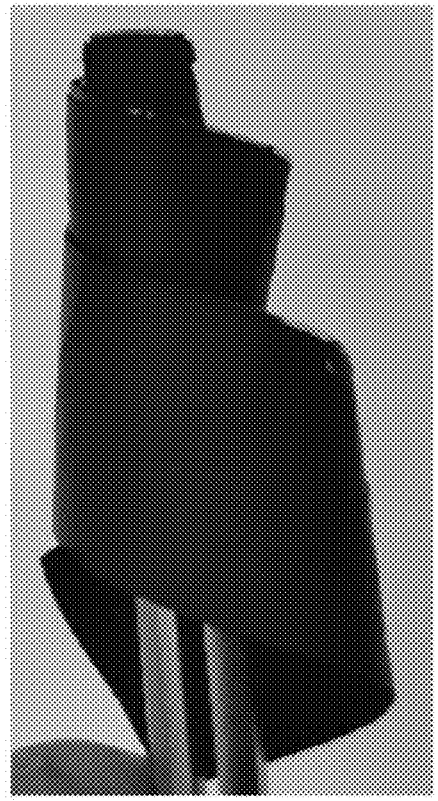
FIG. 5C depicts rolling of the supercapacitor device.
Figure 5F:
FIG. 5F depicts multiple bends of a multi-celled supercapacitor device.
Figure 5E:
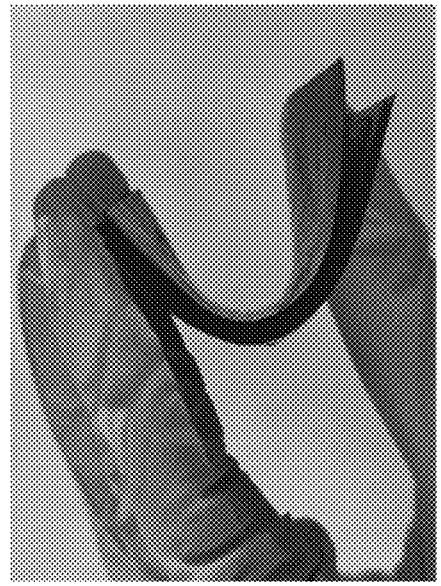
FIG. 5E depicts bending of a multi-celled supercapacitor device.
Figure 6A:
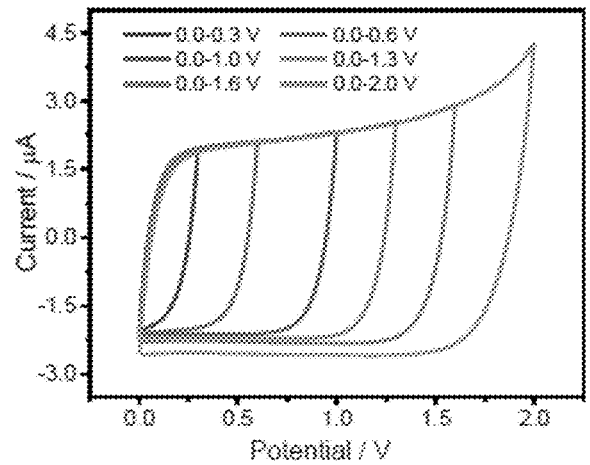
FIG. 6A shows cyclic voltammograms of a biopolymer organogel electrolyte lacking the redox-active molybdenum-containing ions.
Figure 6B:
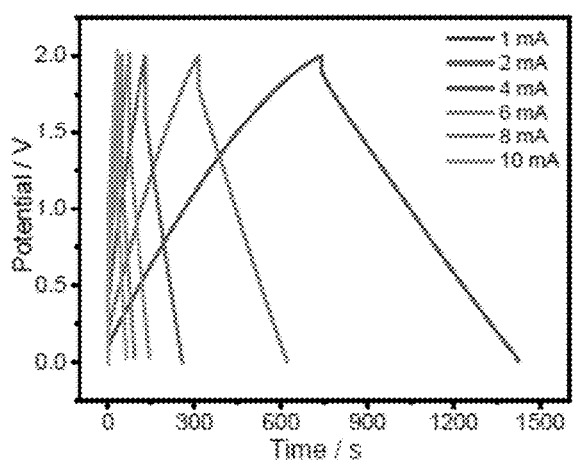
FIG. 6B shows galvanostatic charge-discharge measurements for a supercacpacitor device containing a biopolymer organogel electrolyte lacking the redox-active molybdenum-containing ions.
Figure 6C:
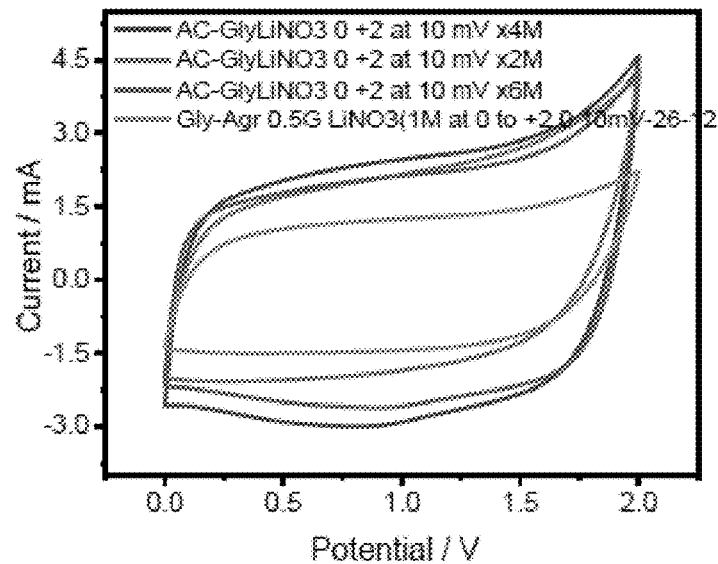
FIG. 6C shows cyclic voltammograms comparing supercapacitor devices with a biopolymer organogel electrolyte lacking the redox-active molybdenum-containing ions to a supercapacitor lacking the biopolymer organogel electrolyte.
Figure 7A:
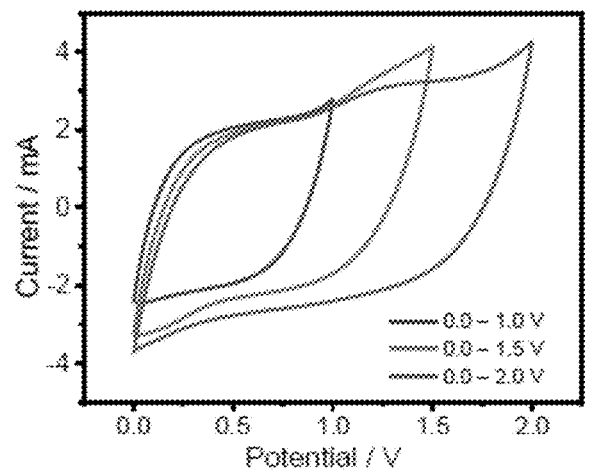
FIG. 7A shows cyclic voltammograms of a biopolymer organogel electrolyte containing the redox-active molybdenum-containing ions.
Figure 7B:
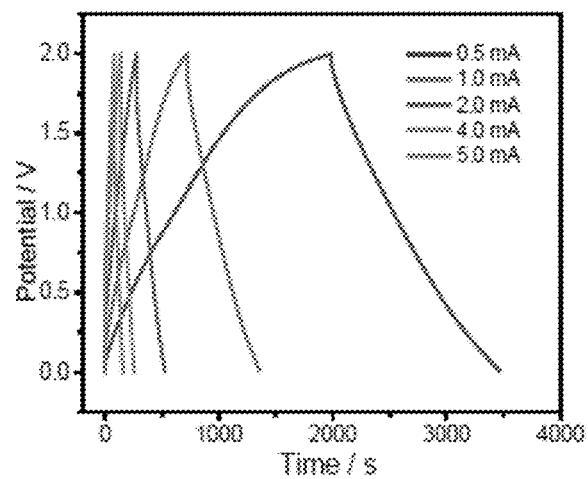
FIG. 7B shows galvanostatic charge-discharge measurements for a supercacpacitor device containing a biopolymer organogel electrolyte containing the redox-active molybdenum-containing ions.
Figure 8A:
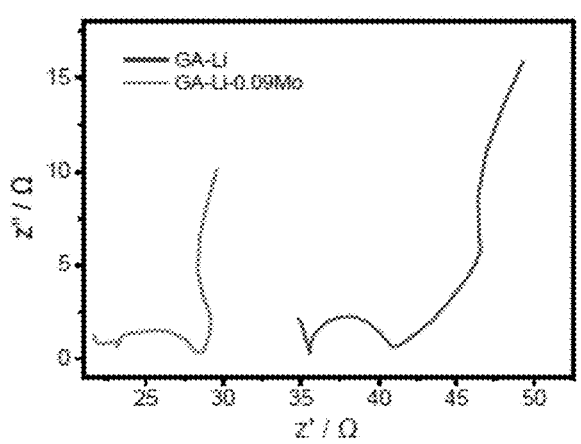
FIG. 8A shows Nyquist plots for a biopolymer organogel electrolyte lacking the redox-active molybdenum-containing ions and a biopolymer organogel electrolyte containing the redox-active molybdenum-containing ions.
Figure 8B:
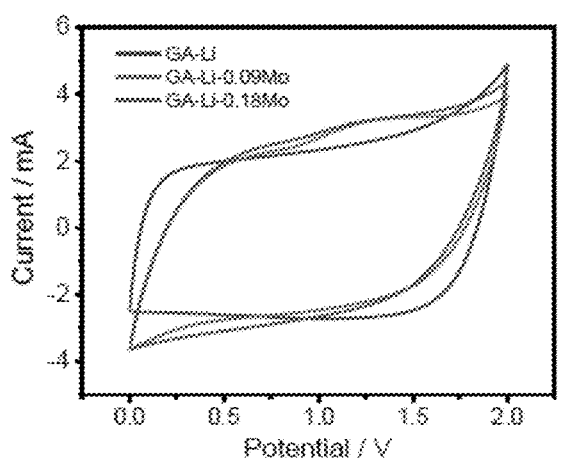
FIG. 8B shows cyclic voltammograms of a biopolymer organogel electrolyte containing various amounts of the redox-active molybdenum-containing ions.
Figure 9A:
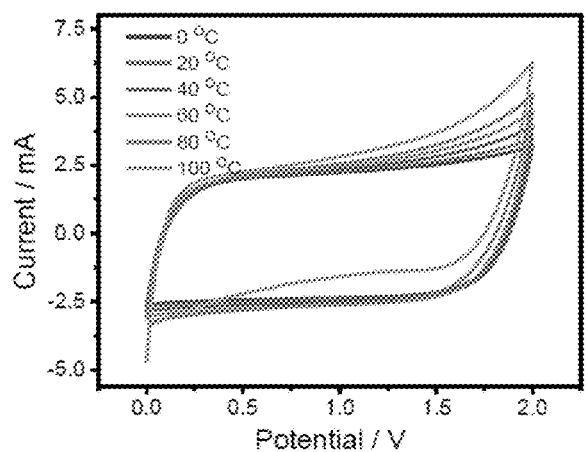
FIG. 9A shows cyclic voltammograms of supercapacitor device at various temperatures.
Figure 9B:
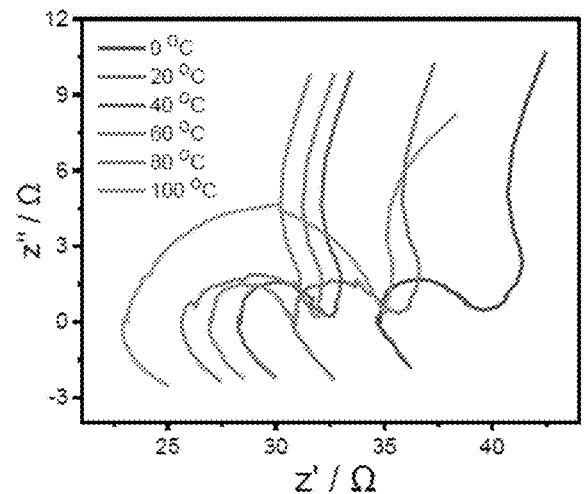
FIG. 9B shows Nyquist plots of a supercapacitor device at various temperatures.
Figure 9C:
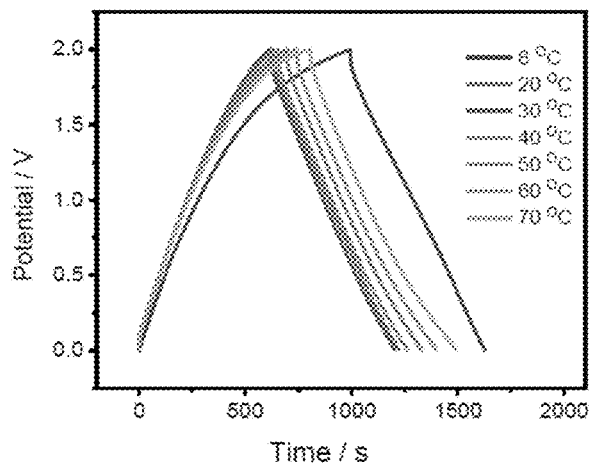
FIG. 9C shows galvanostatic charge-discharge measurements for a supercapacitor device at various temperatures.
Figure 9D:
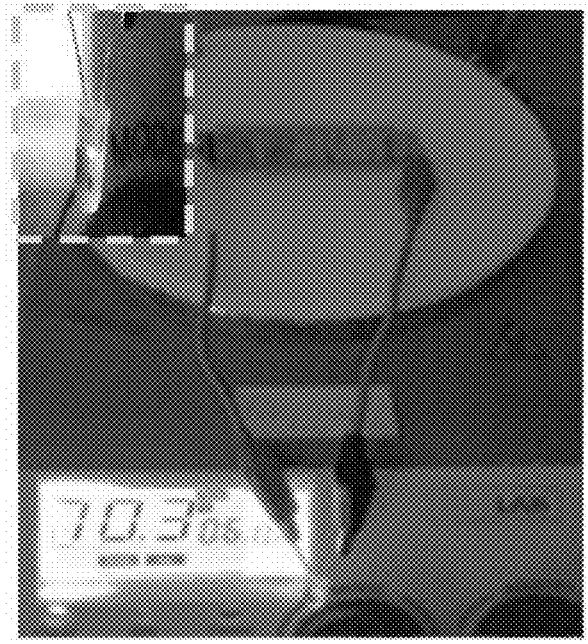
FIG. 9D shows a supercapacitor device powering a red LED at 70° C.
Figure 9E:
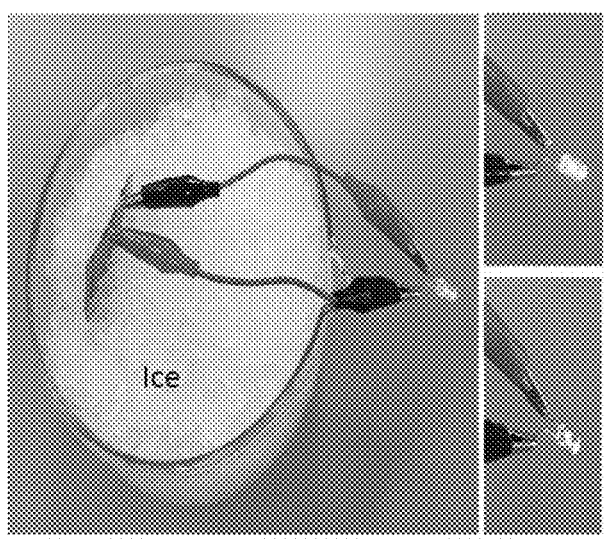
FIG. 9E shows a supercapacitor device powering various colored LEDs at 0° C.
Figure 9F:
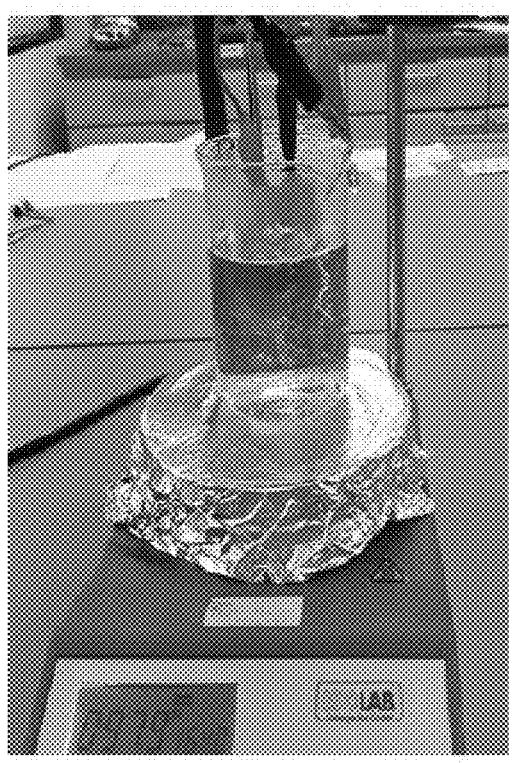
FIG. 9F shows a supercapacitor device powering a LED at 98° C.

As used herein, the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, even more preferably less than about 0.01 wt. %, even more preferably less than about 0.001 wt. %, yet even more preferably 0 wt. %, relative to a total weight of the composition being discussed.

The present disclosure is intended to include all hydration states of a given compound or formula, unless otherwise noted or when heating a material. Likewise, organogels include all types of organogels including polymer, copolymer, homopolymer, temperature-sensitive, thermogels, pH sensitive, electrosensitive, or light-responsive organogels.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, isotopes of oxygen include $^{16}O$, $^{17}O$, and $^{18}O$, and isotopes of manganese include $^{53}Mn$ and $^{55}Mn$. Isotopically-labeled compounds of the disclosure may generally be prepared by techniques known to those skilled in the art or by processes analogous to those described herein, using an appropriate isotopically-labeled reagent in place of the non-labeled reagent otherwise employed.

According to a first aspect, the present disclosure relates to a flexible energy storage device. The flexible energy storage device comprises a pair of electrodes separated by a redox-active biopolymer organogel electrolyte. The redox-active biopolymer organogel electrolyte comprises a biopolymer organogel, redox-active molybdenum-containing ions, and a secondary ionic substance.

The biopolymer organogel comprises a biopolymer gelator and a gel solvent. The biopolymer gelator can be any suitable gelator derived from or including a biopolymer.

As used herein, the term "biopolymer" refers to a polymeric substance produced by a living organism. The term "biopolymer" is a sub-type of polymer and is typically used to exclude artificial or synthetic polymers typically derived from petroleum or petroleum products. Such excluded polymers may be referred to as "artificial polymers", "synthetic polymers", "petro-based polymers", "petrochemical polymers", or other suitable such term. Any polymer which is not a biopolymer can be referred to as a "non-bio polymer". Biopolymers are typically divided into three main types based on the structure and the monomeric unit which makes up the biopolymer: polynucleotides such as DNA and RNA, polypeptides (also referred to as proteins), and polysaccharides. Examples of polypeptide biopolymers include, but are not limited to collagen, gelatin, gluten, whey, silk, keratin, elastin, resilin, reflectin, actin, and fibrin. Examples of polysaccharide biopolymers include, but are not limited to cellulose, starch, amylose, amylopectin, glycogen, galactogen, inulin, amylose, chitin, chitosan, canthan gum, dextran, welan gum, gellan gum, diutan gum, pullulan, alginic acid and salts thereof (alginates), hyaluronic acid, carrageenan, beta-glucan, alguronic acid, alpha-glucan, cyclodextran, hemicellulose, pectin, agarose, agaropectin, and mixtures thereof. There are also materials commonly referred to as "bioplastics" which are plastics formed from either biopolymers or from non-biopolymers formed from ingredients derived from biological sources. Examples of such non-biopolymers formed from ingredients derived from biological sources include polylactic acid typically formed by fermentation, poly-3-hydroxybutyrate, polyamide 11, bio-derived polyethylene, and the like. It should be understood that such non-biopolymers formed from ingredients derived from biological sources are not considered biopolymers as used herein.

In some embodiments, the biopolymer gelator is a polysaccharide biopolymer. In preferred embodiments, the biopolymer gelator is agarose. In some embodiments, the biopolymer gelator comprises agarose and agaropectin. Such a mixture of agarose and agaropectin is commonly referred to as "agar" or "agar agar". In preferred embodiments, an agarose gelator is substantially free of agaropectin. In some embodiments, an agarose gelator is devoid of agaropectin.

In some embodiments, the biopolymer organogel electrolyte may include non-bio polymeric additives. In this context, a polymeric additive refers to a non-bio polymer added to the gel electrolyte which is not incorporated into the structure of the biopolymer. Such polymeric additives are distinct from a secondary biopolymer which makes up a copolymer, which are incorporated into the structure of the biopolymer. Examples of such non-bio polymeric additives include, but are not limited to polyethylene glycol, polyvinyl acetate, polyacrylic acid, polypropylene glycol, polyacrylate, polydimethylsiloxane, polyethylene, poly(maleic acid), polyacrylamide, polyacrylonitrile, poly(N-vinyl acetamide), polystyrene, poly(2-vinylpyridine), poly(2-acrylamido-2-methylpropanesulfonic acid), polymethacrylates such as poly(benzyl methacrylate), poly(butyl methacrylate), poly (cyclohexyl methacrylate), poly(dodecylmethacrylate), poly (2-ethoxyethyl methacrylate), poly(ethyl methacrylate), poly(hexyl methacrylate), poly(2-hydroxyethyl methacrylate), poly(isobutyl methacrylate), poly(isopropyl methacrylate), poly(methyl methacrylate), poly(octadecyl methacrylate), poly(octyl methacrylate), poly(phenyl methacrylate), poly(propyl methacrylate), and poly(2-chloroethyl methacrylate). In some embodiments, the biopolymer organogel electrolyte is substantially free of non-bio polymer additives. In some embodiments, the biopolymer organogel electrolyte is substantially free of polyacrylic acid.

In some embodiments, the biopolymer is crosslinked using a crosslinker. In some embodiments, the biopolymer is agarose and the agarose is crosslinked using a crosslinker. In general, the crosslinker can be any suitable crosslinker for agarose known to one of ordinary skill in the art. Examples of such suitable crosslinkers include, but are not limited to organic acids such as citric acid, oxalic acid, malonic acid, succinic acid, glutaric acid, adipic acid, pimelic acid, maleic acid, phthalic acid, isophthalic acid, terephthalic acid, naphthalene-1,2-dicarboxylic acid, and acid chlorides thereof, and diisothiocyanates such as ethylene-1,2-diisothiocyanate, butylene-1,6-diisothiocyanate, hexylene-1,6-diisothiocyanate, octylene-1,8-diisothiocyanate, decylene-1,10-diisothiocyanate, and butylene-1,3-diisothiocyanate.

In some embodiments, the biopolymer gelator is present in an amount of 2.5 to 50 wt. %, preferably 3 to 48 wt %, preferably 3.5 to 46 wt %, preferably 4.0 to 44 wt %, preferably 4.5 to 42 wt %, preferably 5.0 to 40 wt %, preferably 5.5 to 38 wt %, preferably 6.0 to 36 wt %, preferably 6.5 to 34 wt %, preferably 7.0 to 32 wt %, preferably 7.5 to 30 wt %, preferably 8.0 to 28 wt %, preferably 8.5 to 27 wt %, preferably 9.0 to 26 wt %, preferably 10.0 to 25 wt %, preferably 10.5 to 24 wt %, preferably 11.0 to 23 wt %, preferably 11.5 to 22 wt %, preferably 12.0 to 21 wt %, preferably 12.5 to 20.5 wt %, preferably 13.0 to 20.0 wt %, preferably 13.5 to 19.5 wt %, preferably 14.0 to 19.0 wt %, preferably 14.5 to 18.5 wt %, preferably 15.0 to 18.0 wt %, preferably 15.5 to 17.5 wt %, preferably 16.0 to 17.0 wt %, preferably 16.5 to 16.75 wt %, based on a total weight of biopolymer organogel.

In general, the gel solvent may be any suitable organic solvent known to one of ordinary skill in the art. The gel solvent should be capable of forming a gel with the biopolymer gelator. Examples of suitable organic solvents include, but are not limited to, alcohols such as methanol, ethanol, n-propanol, 2-propanol (also known as isopropanol), ethylene glycol, diethylene glycol, and glycerol; hydrocarbons such as pentane, hexane, and heptane; ketones such as acetone and methyl ethyl ketone; esters such as ethyl acetate; amides such as dimethylformamide; ethers such as tetrahydrofuran, diglyme, and diethyl ether; nitriles such as acetonitrile; halogenated organic solvents such as methylene chloride (also known as dichloromethane), carbon tetrachloride, and chloroform; aromatic organic solvents such as benzene and xylene; amines such as trimethylamine and pyridine; and mixtures thereof. In some embodiments, the gel solvent is a liquid polyol. The term polyol refers to an alcohol having more than one hydroxyl functional group. Examples of liquid polyols include, but are not limited to diols such as ethylene glycol, 1,3-propanediol, 1,2-propanediol, 1,2-butanediol, 1,3-butanediol, 1,4-butanediol, 2,3-butanediol, and the like; and triols such as glycerol, 1,2,4-butanediol, 1,2,3-butanediol, 1,2,6-hexanetriol, and the like. In preferred embodiments, the gel solvent is glycerol.

In some embodiments, the gel solvent is present in an amount of 50 to 97.5 wt %, preferably 55 to 95 wt %, preferably 60 to 94 wt %, preferably 70 to 92 wt %, preferably 72.5 to 91 wt %, preferably 75 to 90 wt %, preferably 77.5 to 88.0 wt %, preferably 80 to 87.5 wt %, preferably 80.5 to 86.5 wt %, preferably 81.0 to 86.0 wt %, preferably 81.5 to 85.5 wt %, preferably 82.0 to 85.0 wt %, preferably 82.5 to 84.5 wt %, preferably 83.0 to 84.0 wt %, preferably 83.25 to 83.5 wt %, based on a total weight of biopolymer organogel.

In some embodiments, the redox-active molybdenum-containing ions are present in an amount of 0.1 to 15.0 wt. %, preferably 0.25 to 12.5 wt %, preferably 0.5 to 10.0 wt %, preferably 0.75 to 7.5 wt %, preferably 1.0 to 5.0 wt %, preferably 1.25 to 3.0 wt %, preferably 1.4 to 2.8 wt %, based on a total weight of redox-active biopolymer organo electrolyte. The redox-active molybdenum-containing ions may contain molybdenum in the +2 oxidation state, the +3 oxidation state, the +4 oxidation state, the +5 oxidation state, the +6 oxidation state, or any combination thereof.

In some embodiments, the redox-active molybdenum-containing ions are monoatomic molybdenum ions. In some embodiments, such monoatomic molybdenum ions are coordinated by at least one glycerol molecule, preferably at least two glycerol molecules, preferably at least three glycerol molecules. These glycerol molecules may be present in the inner coordination sphere of the molybdenum ion. The glycerol molecules coordinated to the monoatomic molybdenum ions may be monodentate or bidentate, but preferably not tridentate. The glycerol molecules may be coordinated to the monoatomic molybdenum ions in protonated form as alcohol ligands or in deprotonated form as alkoxide ligands. In some embodiments, such monoatomic molybdenum ions are coordinated by at least one agarose molecule, preferably at least two agarose molecules, preferably at least three agarose molecules, preferably at least four agarose molecules. Such coordination may be through any suitable functional group on the agarose molecule, preferably a carboxylic acid group. Such a carboxylic acid group may be protonated (acid form) or deprotonated (carboxylate form). These agarose molecules may be present in the inner coordination sphere of the transition metal ions. The agarose molecules coordinated to the redox-active transition metal cations may be monodentate, bidentate, tridentate, or tetradentate. In general, the rest of the inner coordination sphere of the monoatomic molybdenum ion may be filled by any suitable ligand known to one of ordinary skill in the art. Examples of suitable ligands include species with oxygen-containing functional groups such as non-glycerol alcohols, alkoxides, hydroxides, carboxylic acids and carboxylates, esters, and ethers; species with nitrogen-containing functional groups such as amines (understood here to include ammonia), amides, azides, diimides (also known as azo compounds), imines, porphyrins, imides, isonitriles, nitriles, and nitro compounds; species with phosphorous-containing functional groups such as phosphines, phosphites, phosphates, phosphonites, phosphonates, phosphinites, and phosphinates; species with sulfur-containing functional groups such as thiols, thiolates, disulfides, sulfones, sulfonic acids and sulfonates, sulfoxides, thials, thioesters, thiosulfinates, thiocarboxylic acids and thiocarboxylates, sulfinic acids and sulfinates, thiocyanates, and isothiocyanates; hydrocarbons containing one or more π-electron systems such as mesitylene, cyclopentadienyl anion, and cyclooctadecene; halides; and water. In general, the ligands, may be monodentate, bidentate, tridentate, tetradentate, or pentadentate as appropriate. Hexadentate ligands, however, such as ethylenediamine tetraacetic acid (EDTA) are not suitable as such ligands do not leave an open coordination site for coordination of a glycerol molecule. In general, the functional groups may occupy any suitable location on a molecule with acts as a ligand. For example, alcohols or amines may be primary alcohols or amines, secondary alcohols or amines, or tertiary alcohols or amines as appropriate.

In some embodiments, the redox-active molybdenum-containing ions are polyatomic molybdenum-containing ions. Examples of polyatomic molybdenum-containing ions include, but are not limited to molybdate ($MoO_4^{2-}$), dimolybdate ($Mo_2O_7^{2-}$), trimolybdate ($Mo_3O_{10}^{2-}$), tetramolybdate ($Mo_4O_{13}^{2-}$), pentamolybdate ($Mo_5O_{16}^{2-}$), hexamolybdate ($Mo_6O_{19}^{2-}$), heptamolybdate ($Mo_7O_{24}^{6-}$, also known as paramolybdate), octamolybdate ($Mo_8O_{26}^{4-}$), and tetrathiomolybdate ($MoS_4^{2-}$). Additionally, the molybdate may be a heteropolymolybdate such as phosphomolybdate, 6-molybdocolbaltate, or 6-molybdoaluminate. Such polyatomic molybdenum-containing ions may interact with or be associated with at least one, preferably at least two, preferably at least three glycerol molecules in the gel. Such polyatomic molybdenum-containing ions may interact with or be associated with at least one, preferably at least two, preferably at least three agarose molecules in the gel. Such interaction may be through electrostatic interactions. Such interaction may take place in the outer coordination sphere of the polyatomic ion. In preferred embodiments, the redox-active molybdenum-containing ions are molybdate ($MoO_4^{2-}$) ions.

In some embodiments, the redox-active biopolymer organogel electrolyte comprises charge balancing ions. Such charge balancing ions may be cations or anions, as appropriate. Such charge balancing ions may be advantageous for maintaining overall electroneutrality of the redox-active biopolymer organogel electrolyte in the presence of the redox-active molybdenum-containing ions. That is, when the redox-active molybdenum-containing ions are cations, the charge-balancing ions are anions and when the redox-active molybdenum-containing ions are anions, the charge-balancing ions are cations. Such charge-balancing ions may be present in an appropriate amount to balance electrical charges from the redox-active molybdenum-containing ions. In general, charge balancing anions may be any suitable anionic substance known to one of ordinary skill in the art. In some embodiments, the charge balancing anions are selected from the group consisting of hydroxide anions, halide anions, sulfate anions, nitrate anions, perchlorate anions, tetrafluoroborate anions, difluoro(oxalato)borate anions, hexafluorophosphate anions, and bis(trifluoromethanesulfonyl)imide anions. In general, charge balancing cations may be any suitable cationic substance known to one of ordinary skill in the art. In some embodiments, the charge balancing cations are selected from the group consisting of alkali metal cations, alkaline earth cations, transition metal cations, ammonium and organoammonium cations, and hydrogen ions.

The redox-active biopolymer organogel electrolyte comprises 1.0 to 20.0 wt. %, preferably 1.25 to 18.0 wt %, preferably 1.5 to 16.0 wt %, preferably 1.75 to 14.0 wt %, preferably 2.0 to 12.0 wt %, preferably 2.25 to 10.0 wt %, preferably 2.5 to 9.0 wt %, preferably 2.75 to 8.0 wt %, preferably 3.0 to 7.0 wt %, preferably 3.25 to 6.5 wt %, preferably 3.5 to 6.0 wt %, preferably 3.75 to 5.5 wt %, preferably 4.0 to 5.0 wt % a secondary ionic substance which is at least one selected from the group consisting of a lithium salt and a sodium salt. In general, the secondary ionic substance can be any suitable lithium salt, any suitable sodium salt, or any suitable mixture thereof known to one of ordinary skill in the art. Examples of suitable such salts include, but are not limited to nitrates, acetates, lactates, citrates, succinates, halides, chlorates, perchlorates, chlorites, hypochlorites, bromates, perbromates, bromites, hypobromites, iodates, periodates, iodites, hypoiodites, carbonates, bicarbonates, borates, metaborates, triborates, tetraborates, tetrafluoroborates, hexafluorophosphates, hexafluoroaresnates, hexafluorostillbates, hexafluorotantalates, hexafluoroniobates, sulfates, hydrogen sulfates, phosphates, sulfonates, trifluoromethanesulfonates, bistrifluoromethylsulfonyl imides, perfluoroethanesulfonyl imides, cyanides, nitrites, hydroxides, and mixtures thereof.

The redox-active biopolymer organogel electrolyte may be considered a solid electrolyte. In some embodiments, the redox-active biopolymer organogel electrolyte may be referred to as a "solid electrolyte", a "gel polymer electrolyte", a "quasi-solid-state electrolyte" or similar such term. The redox-active biopolymer organogel electrolyte, however, is distinct from a liquid electrolyte in that the redox-active biopolymer organogel electrolyte is not a liquid.

In some embodiments, the redox-active biopolymer organogel electrolyte has a DC conductivity ($\sigma_{DC}$) of $5.00 \times 10^{-5}$ to $1.00 \times 10^{-3}$ Scm$^{-1}$, preferably $7.00 \times 10^{-5}$ to $9.00 \times 10^{-4}$ Scm$^{-1}$, preferably $8.00 \times 10^{-5}$ to $8.00 \times 10^{-4}$ Scm$^{-1}$, preferably $9.00 \times 10^{-5}$ to $7.00 \times 10^{-4}$ Scm$^{-1}$, preferably $1.00 \times 10^{-4}$ to $6.00 \times 10^{-4}$ Scm$^{-1}$, preferably $2.00 \times 10^{-4}$ to $5.00 \times 10^{-4}$ Scm$^{-1}$, preferably $2.50 \times 10^{-4}$ to $5.50 \times 10^{-4}$ Scm$^{-1}$, preferably $3.00 \times 10^{-4}$ to $5.00 \times 10^{-4}$ Scm$^{-1}$, preferably $3.25 \times 10^{-4}$ to $4.75 \times 10^{-4}$ Scm$^{-1}$, preferably $3.50 \times 10^{-4}$ to $4.50 \times 10^{-4}$ Scm$^{-1}$, preferably $3.75 \times 10^{-4}$ to $4.25 \times 10^{-4}$ Scm$^{-1}$, preferably $3.90 \times 10^{-4}$ to $4.10 \times 10^{-4}$ Scm$^{-1}$, preferably $4.00 \times 10^{-4}$ Scm$^{-1}$ at a temperature of 10 to 30° C., preferably 11 to 29° C., preferably 12 to 28° C., preferably 13 to 27° C., preferably 14 to 26° C., preferably 15 to 25° C., preferably 16 to 24° C., preferably 17 to 23° C., preferably 18 to 22° C., preferably 19 to 21° C., preferably 20° C.

In some embodiments, the redox-active biopolymer organogel electrolyte has an AC conductivity of $2.00 \times 10^{-5}$ to $6.50 \times 10^{-4}$ Scm$^{-1}$, preferably $3.00 \times 10^{-5}$ to $6.00 \times 10^{-4}$ Scm$^{-1}$, preferably $4.00 \times 10^{-5}$ to $5.50 \times 10^{-4}$ Scm$^{-1}$, preferably $5.00 \times 10^{-5}$ to $5.00 \times 10^{-4}$ Scm$^{-1}$, preferably $6.00 \times 10^{-5}$ to $4.50 \times 10^{-4}$ Scm$^{-1}$, preferably $6.50 \times 10^{-5}$ to $4.00 \times 10^{-4}$ Scm$^{-1}$, preferably $7.00 \times 10^{-5}$ to $3.50 \times 10^{-4}$ Scm$^{-1}$, preferably $7.50 \times 10^{-5}$ to $3.25 \times 10^{-4}$ Scm$^{-1}$, preferably $8.00 \times 10^{-5}$ to $3.00 \times 10^{-4}$ Scm$^{-1}$, preferably $8.50 \times 10^{-5}$ to $2.75 \times 10^{-4}$ Scm$^{-1}$, preferably $9.00 \times 10^{-5}$ to $2.50 \times 10^{-4}$ Scm$^{-1}$, preferably $9.50 \times 10^{-5}$ to $2.25 \times 10^{-4}$ Scm$^{-1}$, preferably $1.00 \times 10^{-4}$ to $2.00 \times 10^{-4}$ Scm$^{-1}$ at a frequency of $10^3$ to $10^6$ Hz and a temperature of 10 to 30° C., preferably 11 to 29° C., preferably 12 to 28° C., preferably 13 to 27° C., preferably 14 to 26° C., preferably 15 to 25° C., preferably 16 to 24° C., preferably 17 to 23° C., preferably 18 to 22° C., preferably 19 to 21° C., preferably 20° C.

In some embodiments, the redox-active biopolymer organogel electrolyte has a maximum dielectric loss at a frequency of $5.00 \times 10^3$ to $1.00 \times 10^5$, preferably $5.50 \times 10^3$ to $9.00 \times 10^4$ Hz, preferably $6.00 \times 10^3$ to $8.00 \times 10^4$ Hz, preferably $6.50 \times 10^3$ to $7.00 \times 10^4$ Hz, preferably $7.00 \times 10^3$ to $6.00 \times 10^4$ Hz, preferably $7.50 \times 10^3$ to $5.00 \times 10^4$ Hz, preferably $8.00 \times 10^3$ to $4.00 \times 10^4$ Hz, preferably $9.50 \times 10^3$ to $3.00 \times 10^4$ Hz, preferably $9.00 \times 10^3$ to $2.00 \times 10^4$ Hz at a temperature of 10 to 30° C., preferably 11 to 29° C., preferably 12 to 28° C., preferably 13 to 27° C., preferably 14 to 26° C., preferably 15 to 25° C., preferably 16 to 24° C., preferably 17 to 23° C., preferably 18 to 22° C., preferably 19 to 21° C., preferably 20° C.

In some embodiments, the redox-active biopolymer organogel electrolyte is transparent. The term "transparent" as used in this disclosure refers to an electrolyte, which preferably has a light transmittance of at least 50%, preferably at least 60%, preferably 65-95%, preferably 75-90% when exposed to a light radiation with a wavelength of 300-1,000 nm, preferably 350-900 nm, preferably 400-800 nm. In terms of the present disclosure, transmittance of a material is an ability of the material to transmit radiant energy therethrough; therefore, the "light transmittance" is a percentage of radiant energy that is transmitted through a material which is not lost due to absorption, scattering, reflection, etc.

In some embodiments, the flexible energy storage device may retain greater than 75%, preferably greater than 77.5%, preferably greater than 80%, preferably greater than 82.5%, preferably greater than 85%, preferably greater than 87.5%, preferably greater than 90%, preferably greater than 92.5%, preferably greater than 95%, preferably greater than 97.5% of an unbent energy storage capacity when bent at an angle of 10 to 170°, preferably 12.5 to 167.5°, preferably 15 to 165°, preferably 17.5 to 162.5°, preferably 20 to 160°, preferably 22.5 to 157.5°, preferably 25 to 155°, preferably 27.5 to 152.5°, preferably 30 to 150°, preferably 35 to 155°, preferably 40 to 160°, preferably 45 to 160°, preferably 50 to 170°.

In some embodiments, the flexible energy storage device is capable of being twisted and/or bent to an angle of 0 to 180° without breaking, tearing, or ripping at a temperature of −40 to 120° C., preferably −40 to 120° C., preferably −35 to 115° C., preferably −30 to 110° C., preferably −25 to 105° C., preferably −20 to 100° C.

In some embodiments, the flexible energy storage device is capable of being bent without breaking, tearing, or ripping with a bending radius which is less than 1,000 times, preferably less than 900 times, preferably less than 800 times, preferably less than 750 times, preferably less than 700 times, preferably less than 650 times, preferably less than 600 times, preferably less than 550 times, preferably less than 500 times, preferably less than 475 times, preferably less than 450 times, preferably less than 425 times, preferably less than 400 times, preferably less than 375 times, preferably less than 350 times, preferably less than 325 times, preferably less than 300 times, preferably less than 275 times, preferably less than 250 times, preferably less than 225 times, preferably less than 200 times, preferably less than 175 times, preferably less than 150 times, preferably less than 125 times, preferably less than 100 times, preferably less than 90 times, preferably less than 80 times, preferably less than 70 times, preferably less than 60 times, preferably less than 50 times, preferably less than 40 times, preferably less than 30 times, preferably less than 25 times, preferably less than 20 times, preferably less than 15 times, preferably less than 10 times, preferably less than 7.5 times, preferably less than 5 times, preferably less than 2.5 times, preferably less than 2.0 times, preferably less than 1.5 times a thickness of the flexible energy storage device. In some embodiments, the flexible energy storage device is capable of being folded without breaking, tearing, or ripping. Such a bending can be, for example, a single bend, a rolling, multiple bends, or any combination thereof. For multiple bends, each bend may be in substantially the same direction or may be in different directions, such as alternating or zig-zag type bending. Rolling in this context could be considered a single, continuous bend which occurs throughout a rolled region of the flexible energy storage device. In some embodiments, the flexible energy storage device is capable of being twisted without breaking, tearing, or ripping with a twist angle defined as a difference in orientation of a first segment of the twist and orientation of a second segment of the twist which are separated by a distance which is less than 1,000 times, preferably less than 900 times, preferably less than 800 times, preferably less than 750 times, preferably less than 700 times, preferably less than 650 times, preferably less than 600 times, preferably less than 550 times, preferably less than 500 times, preferably less than 475 times, preferably less than 450 times, preferably less than 425 times, preferably less than 400 times, preferably less than 375 times, preferably less than 350 times, preferably less than 325 times, preferably less than 300 times, preferably less than 275 times, preferably less than 250 times, preferably less than 225 times, preferably less than 200 times, preferably less than 175 times, preferably less than 150 times, preferably less than 125 times, preferably less than 100 times, preferably less than 90 times, preferably less than 80 times, preferably less than 70 times, preferably less than 60 times, preferably less than 50 times, preferably less than 40 times, preferably less than 30 times, preferably less than 25 times, preferably less than 20 times, preferably less than 15 times, preferably less than 10 times, preferably less than 7.5 times, preferably less than 5 times, preferably less than 2.5 times a thickness of the flexible energy storage device.

The bending may be performed by any suitable technique or using any suitable equipment known to one of ordinary skill in the art. For example, the bending may be performed for testing purposes using a mandrel bending tester. Such a tester involves the use of cylindrical mandrel around which a material or device may be bent. The mandrel may be useful for creating or maintaining a specific desired bending radius. The mandrel bending tester may contain a handle useful for bending a material or device to be bent at a specific bending angle.

In general, the flexible energy storage device may be any suitable energy storage device known to one of ordinary skill in the art. Examples of energy storage devices include a supercapacitor, a fuel cell, and a battery. In some embodiments, the flexible energy storage device is a supercapacitor. In some embodiments, the flexible energy storage device is a fuel cell. In some embodiments, the flexible energy storage device is a battery. In general, the supercapacitor may be any suitable type of supercapacitor known to one of ordinary skill in the art. In general, the battery may be any suitable type of battery known to one of ordinary skill in the art. In general, the fuel cell may be any suitable type of fuel cell known to one of ordinary skill in the art.

In general, the energy storage capacity of the flexible energy storage device may be any suitable measure of energy storage capacity known to one of ordinary skill in the art. As different types of devices (e.g. supercapacitors, fuel cells, batteries, and the like) store energy in different manners, a different measure may be used to determine the energy storage capacity for different types of devices. For example, for supercapacitors, suitable measures for energy storage capacity include, but are not limited to capacitance, specific capacitance, energy density, power density, specific energy, and specific power. For example, for batteries, suitable measures for energy storage capacity include, but are not limited to capacity, specific energy, power density, and specific power.

A supercapacitor according to an exemplary embodiment of the present disclosure may comprise a pair of electrodes separated by the redox-active biopolymer organogel electrolyte as described herein. Such a combination may be referred to as a cell. Based on this terminology, the supercapacitor comprises a minimum of one cell. In some embodiments, the supercapacitor comprises one cell. In alternative embodiments, the supercapacitor comprises more than one cell, for example two cells, three cells, four cells, five cells, six cells, seven cells, eight cells, nine cells, ten cells, or more. The cells may be connected in series, parallel, or a combination of cells connected in series and in parallel.

In general, the electrodes may be any suitable electrodes known to one of ordinary skill in the art. In preferred embodiments, one or both the electrodes are carbon electrodes. In some embodiments, the carbon electrodes comprise conductive carbon. In general, the conductive carbon may be any suitable conductive carbon known to one of ordinary skill in the art. In some embodiments, the conductive carbon has a mean primary particle size of 25 to 75 nm, preferably 30 to 70 nm, preferably 35 to 65 nm, preferably 40 to 60 nm. In some embodiments, the conductive carbon has a BET nitrogen surface area of 50 to 75 $m^2/g$, preferably 55 to 70 $m^2/g$, preferably 60 to 65 $m^2/g$, preferably 61 to 63 $m^2/g$. In some embodiments, the conductive carbon has a density of about 150 to 170 $kg/m^3$, preferably about 152.5 to 167.5 $kg/m^3$, preferably about 155 to 165 $kg/m^3$, preferably about 157.5 to 162.5 $kg/m^3$, preferably about 160 $kg/m^3$. In some embodiments, the conductive carbon is present in an amount of 1 to 20 wt. %, preferably 2 to 18 wt. %, preferably 3 to 17 wt. %, preferably 4 to 16 wt. %, preferably 5 to 15 wt. %, preferably 6 to 14 wt. %, preferably 7 to 13 wt. %, preferably 8 to 12 wt. %, preferably 9 to 11 wt. %, preferably 10 wt. %, based on a total weight of the carbon electrode.

In some embodiments, the carbon electrodes comprise activated carbon. In general, the activated carbon may be any suitable activated carbon known to one of ordinary skill in the art. In some embodiments, the activated carbon has a mean primary particle size of 2 to 10 μm, preferably 3 to 9 μm, preferably 4 to 8 μm, preferably 5 to 7 μm. In some embodiments, the activated carbon has a BET surface area of 1250 to 2250 $m^2/g$, preferably 1300 to 2150 $m^2/g$, preferably 1400 to 1950 $m^2/g$, preferably 1500 to 1850 $m^2/g$. In some embodiments, the activated carbon has a density of about 350 to 550 $kg/m^3$, preferably about 375 to 525 $kg/m^3$, preferably about 400 to 500 $kg/m^3$, preferably about 425 to 475 $kg/m^3$, preferably about 450 $kg/m^3$. In some embodiment, the activated carbon is present in an amount of 60 to 98 wt. %, preferably 63 to 96 wt. %, preferably 65 to 94 wt. % preferably 68 to 92 wt. %, preferably 70 to 90 wt. %, preferably 72 to 88 wt. %, preferably 74 to 86 wt. %, preferably 76 to 84 wt. %, preferably 78 to 82 wt. %, preferably 80 wt. %, based on a total weight of the carbon electrode.

In some embodiments, the electrodes comprise a conductive electrode support on which the carbon is disposed. Such a conductive electrode support may also be referred to as a "collection layer" or a "current collector". In some embodiments, the conductive electrode support is a metal support. Examples of metals which may be used in the metal support include, but are not limited to gold, silver, copper, aluminum, platinum, nickel, and titanium. In some embodiments, the metal support is aluminum. In general, the conductive electrode support may be any suitable shape or geometry known to one of ordinary skill in the art. Examples of such shapes or geometries include foils, meshes, foams, porous sheets, and bound aggregates.

In some embodiments, the electrodes comprise a binder. In general, the binder may be any suitable binder known to one of ordinary skill in the art. Examples of binders include, but are not limited to for example, poly(vinylidene difluoride) (PVdF), polytetrafluoroethylene (PTFE), styrene butadiene rubber (SBR), carboxymethyl cellulose (CMC optionally as a salt, e.g., Na, K, Li, or the like), polyacrylic acid, polyethylene glycol (PEG), polyacrylonitrile, polystyrene, polyurethane, polyisoprene, polyethylene, polypropylene, ethylene propylene diene monomer (EPDM) rubber, poly (vinyl butyral), poly(vinyl acetate), poly(butyl acrylate), poly(methyl acrylate), chitosan, alginate, pectin, amylose, xanthan gum, gum arabic, gellan gum, Carrageenan, karaya gum, cellulose, guar gum, Tara gum, Tragacanth gum, gelatin, and caseinate. In some embodiments, the binder is present in an amount of 1 to 20 wt. %, preferably 2 to 18 wt. %, preferably 3 to 17 wt. %, preferably 4 to 16 wt. %, preferably 5 to 15 wt. %, preferably 6 to 14 wt. %, preferably 7 to 13 wt. %, preferably 8 to 12 wt. %, preferably 9 to 11 wt. %, preferably 10 wt. %, based on a total weight of the carbon electrode.

In some embodiments, the flexible energy storage device comprises an electrolyte support. The electrolyte support may be any suitable structure, at least a portion of which is located between the pair of electrodes, which provides a mechanical benefit and/or an electrical benefit to the flexible energy storage device. Such a mechanical benefit may be or involve, for example, increasing a flexural stiffness of the device, enhancing mechanical integrity of the organogel electrolyte, or preventing loss of the organogel electrolyte. Such an electrical benefit may be or involve, for example, increasing capacitance, increasing an operable temperature range of the energy storage device, or increasing the energy density of the device. In some embodiments, the electrolyte support may maintain or help maintain the flexible energy storage device in a bent state, even in the absence of an external bending force. In alternative embodiments, the electrolyte support may provide a restoring force which restores or helps restore the flexible energy storage device to an unbent state in the absence of an external bending force. In general, the electrolyte support may be placed in any configuration with the organogel electrolyte, provided that at least a portion of the electrolyte support is located between the electrodes. For example, the electrolyte support may be disposed between an electrode and the organogel electrolyte, be embedded within the organogel electrolyte, surround the organogel electrolyte, or encompass and penetrate the organogel electrolyte such that the organogel electrolyte is embedded within the electrolyte support. In general, the electrolyte support may be any suitable shape known to one of ordinary skill in the art. Examples of such suitable shapes include, but are not limited to a mesh, a screen, and a film. In some embodiments, the electrolyte support is non-conductive. In alternative embodiments, the electrolyte support is conductive. In such embodiments, the electrolyte support should not cause a short-circuit or other detrimental electrical behavior of the flexible energy storage device. The electrolyte support may be constructed of any suitable material known to one of ordinary skill in the art. Examples of such suitable materials include, but are not limited to metals such as aluminum, gold, copper, and silver, and polymers. Such polymers may be biopolymers or non-bio polymers as described above. In some embodiments, the electrolyte support comprises an elastomeric material. As the electrolyte support is a separate structure, which may be in contact with but does not form part of the organogel which makes up the redox-active biopolymer organogel electrolyte, the inclusion of a non-bio polymer or non-bio polymer-containing electrolyte support layer should not be considered as an inclusion of such a non-bio polymer in the redox-active biopolymer organogel electrolyte.

In some embodiments, the flexible energy storage device may comprise an electrode integration layer. The electrode integration layer is a material disposed between an electrode and the organogel electrolyte. The electrode integration layer may be advantageous for providing a mechanical benefit, electrical benefit, or both, as described above. The electrode integration layer may further be advantageous for enhancing contact or contact integrity between the electrode and the redox-active biopolymer organogel electrolyte. Such contact or contact integrity may be enhanced in a mechanical sense, for example greater adhesion or adhesion over a wider temperature range; in an electrical sense, for example greater conductivity or providing a material of intermediate conductivity between the electrode and the organogel electrolyte; or both. The electrode integration layer may be any suitable material known to one of ordinary skill in the art. In some embodiments, the electrode integration layer is a non-bio polymer. In some embodiments, the electrode integration layer is a non-agarose biopolymer. Examples of non-agarose biopolymers include the biopolymers as described above.

In some embodiments, the electrolyte support and/or the electrode integration layer comprise surface hydroxyl functional groups. Such surface hydroxyl functional groups may be advantageous for increased contact or integration with the redox-active biopolymer organogel electrolyte. Such surface hydroxyl functional groups may be part of the structure of the material of which the electrolyte support and/or electrode integration layer is made up, for example chitosan and cellulose. Alternatively, such surface hydroxyl functional groups may be added via a surface treatment. The surface treatment may convert non-hydroxyl functional groups to hydroxyl functional groups, for example the reduction of carbonyl or carboxyl groups. Alternatively, the surface treatment may add a hydroxyl functional group-containing material to the surface of the electrolyte support and/or electrode integration layer. The hydroxyl functional group-containing material may form chemical bonds to the electrolyte support and/or electrode integration layer such as with hydroxyl-containing silanes, hydroxyl-containing organometallic materials, or hydroxyl-containing metal coordination material. Alternatively, the hydroxyl functional group-containing material may not form chemical bonds with the electrolyte support and or electrode integration layer as in hydroxyl-containing resins or hydroxyl-containing polymer coatings.

In some embodiments, the flexible energy storage device may comprise organic redox-active additives such as quinone compounds, hydroquinone compounds, indole compounds, and halogenated derivatives thereof. Examples of such exclude organic redox-active additives include hydroquinone monomethyl ether, hydroxy acetophenone, hydroxybenzaldehyde, hydroxy benzoic acid, hydroxybenzonitrile, acetaminophen, hydroxybenzyl alcohol, hydroxycinnamic acid, methylparabin, 2,5-dihydroxy-1,4-benzoquinone, resorcinol, ascorbic acid, ascorbic acid derivative, 1,4-dihydroxy benzene, 3-hydroxy tyramine (dopamine), rhodizonic acid, co-enzyme Q, 1,2,3-trihydroxy benzene (pyrogallol), 1,3,5-trihydroxy benzene (phloroglucinol), tetrahydroxy quinone (THQ), tetrahydroxy acetophenone, tetrahydroxy benzoic acid, hexahydroxy benzene, tetrahydroxy quinone, hexahydroxybenzene, chloranilic acid, chloranilic acid, chloranil, rhodizonic acid, fluoroanilic acid, reduced fluoroanilic acid, fluoranil, duroquinone, 1-nitroso-2-napthol, martius yellow, hydroxy-1,4-naphthaquinone, naphthalene diol, tetrahydroxy napthalene, tetrahydroxy 1,4-naphthaquinone, echinochrome, pentahydroxy 1,4-naphthaquinone, anthranol, hydroxy anthraquinone, anthralin, anthrarufin, alizarin, di-hydroxyanthraquinone, anthrobin, anthragallol, purpurin, 1,8,9-anthracenetriol, 1,2,5,8-tetrahydroxyanthraquinone, carminic acid, purpogallin, hydroxybenzophenone, hydroquinone monobenzylether, hydroxy biphenyl, 2,2,4,4-tetrahydroxy benzophenone, phenolphthalein, indophenol, bromophenol blue, methylenedigallic acid, methylenedisalicyclic acid, 5-hydroxy-2(5H)-furanone, hydroxycourmarin, fustin, hydroxindole, tetrahydropapaveroline, oxindole, o-phenanthroline, phenanthridine, 6(5H)phenanthridinone, hydroxyjulolidine, citrazinic acid, uracil, 2-amino-5-bromopyridine, 5-aminotetrazole monohydrate, 2-aminothiazole, 2-aminopyrimidine, 2-amino-3-hydroxypyridine, 2,4,6-triaminopyrimidine, 2,4-diamino-6-hydroxy pyrimidine, 5,6-diamino-1,3-dimethyluracil hydrate, 5,6-diamino-2-thiouracil, cyanuric acid, and/or hydroxy methyl pyridine. In some embodiments, the flexible energy storage device is substantially free of organic redox-active additives.

In some embodiments, the flexible energy storage device is a battery. In general, the battery may be any suitable type of battery known to one of ordinary skill in the art. In some embodiments, the battery is a lithium ion battery. In such embodiments, the secondary ionic substance comprises lithium. In some embodiments, the lithium ion battery has at least one electrode comprising a lithium-containing material. In some embodiments, the battery is a sodium ion battery. In such embodiments, the secondary ionic substance comprises sodium. In some embodiments, the sodium ion battery has at least one electrode comprising a sodium-containing material.

The present disclosure also relates to a method of forming the flexible energy storage device described above, the method comprising mixing the biopolymer gelator, gel solvent, redox-active molybdenum-containing ions, and secondary ionic substance to form the redox-active biopolymer organogel electrolyte, disposing the redox-active biopolymer organogel electrolyte on a first electrode such that the redox-active biopolymer organogel electrolyte forms a uniform film covering an entirety of a top surface of the first electrode, and placing onto the redox-active biopolymer organogel electrolyte a second electrode such that the second electrode is separated from the first electrode by the redox-active biopolymer organogel electrolyte to form the flexible energy storage device.

In some embodiments, one or both the electrodes are carbon electrodes as described above. In preferred embodiments, both the electrodes are carbon electrodes as described above. In some embodiments, the carbon electrode(s) is (are) prepared by uniformly depositing on a metal support a film comprising activated carbon, conductive carbon, and a binder such that an entirety of a top surface of the metal support is individually covered by the film to form a carbon electrode. The conductive electrode support, activated carbon, conductive carbon, and binder may be as described above.

The present disclosure also relates to a redox-active biopolymer organogel electrolyte, comprising 75 to 98.9 wt. %, preferably 80 to 98 wt %, preferably 85 to 97 wt %, preferably 87.5 to 96.5 wt %, preferably 90 to 96 wt %, preferably 90.5 to 95.5 wt %, preferably 91 to 95 wt %, preferably 92.0 to 94.75 wt %, preferably 92.2 to 94.6 wt % a biopolymer organogel comprising a biopolymer gelator and a gel solvent, 0.1 to 15.0 wt. %, preferably 0.25 to 12.5 wt %, preferably 0.5 to 10.0 wt %, preferably 0.75 to 7.5 wt %, preferably 1.0 to 5.0 wt %, preferably 1.25 to 3.0 wt %, preferably 1.4 to 2.8 wt % redox-active molybdenum-containing ions, and 1.0 to 20.0 wt. %, preferably 1.25 to 18.0 wt %, preferably 1.5 to 16.0 wt %, preferably 1.75 to 14.0 wt %, preferably 2.0 to 12.0 wt %, preferably 2.25 to 10.0 wt %, preferably 2.5 to 9.0 wt %, preferably 2.75 to 8.0 wt %, preferably 3.0 to 7.0 wt %, preferably 3.25 to 6.5 wt %, preferably 3.5 to 6.0 wt %, preferably 3.75 to 5.5 wt %, preferably 4.0 to 5.0 wt % a secondary ionic substance which is at least one selected from the group consisting of a lithium salt and a sodium salt, each based on a total weight of redox-active biopolymer organogel electrolyte, wherein the redox-active biopolymer organogel electrolyte is capable of being twisted and/or bent to an angle of 0 to 1800 without breaking, tearing, or ripping at a temperature of −40 to 120° C., preferably −35 to 115° C., preferably −30 to 110° C., preferably −25 to 105° C., preferably −20 to 100° C.

In some embodiments, the biopolymer gelator is agarose and is present in an amount of 2.5 to 50 wt. %, preferably 3 to 48 wt %, preferably 3.5 to 46 wt %, preferably 4.0 to 44 wt %, preferably 4.5 to 42 wt %, preferably 5.0 to 40 wt %, preferably 5.5 to 38 wt %, preferably 6.0 to 36 wt %, preferably 6.5 to 34 wt %, preferably 7.0 to 32 wt %, preferably 7.5 to 30 wt %, preferably 8.0 to 28 wt %, preferably 8.5 to 27 wt %, preferably 9.0 to 26 wt %, preferably 10.0 to 25 wt %, preferably 10.5 to 24 wt %, preferably 11.0 to 23 wt %, preferably 11.5 to 22 wt %, preferably 12.0 to 21 wt %, preferably 12.5 to 20.5 wt %, preferably 13.0 to 20.0 wt %, preferably 13.5 to 19.5 wt %, preferably 14.0 to 19.0 wt %, preferably 14.5 to 18.5 wt %, preferably 15.0 to 18.0 wt %, preferably 15.5 to 17.5 wt %, preferably 16.0 to 17.0 wt %, preferably 16.5 to 16.75 wt %, based on a total weight of biopolymer organogel, and the gel solvent is glycerol and is present in an amount of 50 to 97.5 wt %, preferably 55 to 95 wt %, preferably 60 to 94 wt %, preferably 70 to 92 wt %, preferably 72.5 to 91 wt %, preferably 75 to 90 wt %, preferably 77.5 to 88.0 wt %, preferably 80 to 87.5 wt %, preferably 80.5 to 86.5 wt %, preferably 81.0 to 86.0 wt %, preferably 81.5 to 85.5 wt %, preferably 82.0 to 85.0 wt %, preferably 82.5 to 84.5 wt %, preferably 83.0 to 84.0 wt %, preferably 83.25 to 83.5 wt %, based on a total weight of biopolymer organogel.

In some embodiments, the redox-active molybdenum-containing ions are molybdate anions.

In some embodiments, the redox-active biopolymer organogel electrolyte is substantially free of agaropectin.

In some embodiments, the redox-active biopolymer organogel electrolyte has a DC conductivity ($\sigma_{DC}$) of $5.00\times10^{-5}$ to $1.00\times10^{-3}$ Scm$^{-1}$, preferably $7.00\times10^{-5}$ to $9.00\times10^{-4}$ Scm$^{-1}$, preferably $8.00\times10^{-5}$ to $8.00\times10^{-4}$ Scm$^{-1}$, preferably $9.00\times10^{-5}$ to $7.00\times10^{-4}$ Scm$^{-1}$, preferably $1.00\times10^{-4}$ to $6.00\times10^{-4}$ Scm$^{-1}$, preferably $2.00\times10^{-4}$ to $5.00\times10^{-4}$ Scm$^{-1}$, preferably $2.50\times10^{-4}$ to $5.50\times10^{-4}$ Scm$^{-1}$, preferably $3.00\times10^{-4}$ to $5.00\times10^{-4}$ Scm$^{-1}$, preferably $3.25\times10^{-4}$ to $4.75\times10^{-4}$ Scm$^{-1}$, preferably $3.50\times10^{-4}$ to $4.50\times10^{-4}$ Scm$^{-1}$, preferably $3.75\times10^{-4}$ to $4.25\times10^{-4}$ Scm$^{-1}$, preferably $3.90\times10^{-4}$ to $4.10\times10^{-4}$ Scm$^{-1}$, preferably $4.00\times10^{-4}$ Scm$^{-1}$ at a temperature of 10 to 30° C., preferably 11 to 29° C., preferably 12 to 28° C., preferably 13 to 27° C., preferably 14 to 26° C., preferably 15 to 25° C., preferably 16 to 24° C., preferably 17 to 23° C., preferably 18 to 22° C., preferably 19 to 21° C., preferably 20° C.

In some embodiments, the redox-active biopolymer organogel electrolyte has an AC conductivity of $2.00\times10^{-5}$ to 6.50×10$^{-4}$ Scm$^{-1}$, preferably 3.00×10$^{-5}$ to 6.00×10$^{-4}$ Scm$^{-1}$, preferably 4.00×10$^{-5}$ to 5.50×10$^{-4}$ Scm$^{-1}$, preferably 5.00×10$^{-5}$ to 5.00×10$^{-4}$ Scm$^{-1}$, preferably 6.00×10$^{-5}$ to 4.50×10$^{-4}$ Scm$^{-1}$, preferably 6.50×10$^{-5}$ to 4.00×10$^{-4}$ Scm$^{-1}$, preferably 7.00×10$^{-5}$ to 3.50×10$^{-4}$ Scm$^{-1}$, preferably 7.50× 10$^{-5}$ to 3.25×10$^{-4}$ Scm$^{-1}$, preferably 8.00×10$^{-5}$ to 3.00×10$^{-4}$ Scm$^{-1}$, preferably 8.50×10$^{-5}$ to 2.75×10$^{-4}$ Scm$^{-1}$, preferably 9.00×10$^{-5}$ to 2.50×10$^{-4}$ Scm$^{-1}$, preferably 9.50×10$^{-5}$ to 2.25×10$^{-4}$ Scm$^{-1}$, preferably 1.00×10$^{-4}$ to 2.00×10$^{-4}$ Scm$^{-1}$ at a frequency of 10$^3$ to 10$^6$ Hz and a temperature of 10 to 30° C., preferably 11 to 29° C., preferably 12 to 28° C., preferably 13 to 27° C., preferably 14 to 26° C., preferably 15 to 25° C., preferably 16 to 24° C., preferably 17 to 23° C., preferably 18 to 22° C., preferably 19 to 21° C., preferably 20° C.

In some embodiments, the redox-active biopolymer organogel electrolyte has a maximum dielectric loss at a frequency of 5.00×10$^3$ to 1.00×10$^5$, preferably 5.50×10$^3$ to 9.00×10$^4$ Hz, preferably 6.00×10$^3$ to 8.00×10$^4$ Hz, preferably 6.50×10$^3$ to 7.00×10$^4$ Hz, preferably 7.00×10$^3$ to 6.00×10$^4$ Hz, preferably 7.50×10$^3$ to 5.00×10$^4$ Hz, preferably 8.00×10$^3$ to 4.00×10$^4$ Hz, preferably 9.50×10$^3$ to 3.00×10$^4$ Hz, preferably 9.00×10$^3$ to 2.00×10$^4$ Hz at a temperature of 10 to 30° C., preferably 11 to 29° C., preferably 12 to 28° C., preferably 13 to 27° C., preferably 14 to 26° C., preferably 15 to 25° C., preferably 16 to 24° C., preferably 17 to 23° C., preferably 18 to 22° C., preferably 19 to 21° C., preferably 20° C.

EXAMPLES

Materials

Glycerol C$_3$H$_8$O$_3$, agarose C$_{24}$H$_{38}$O$_{19}$, lithium nitrate LiNO$_3$, ammonium molybdate ((NH$_4$)$_6$Mo$_7$O$_{24}$·4H$_2$O) were obtained from Merck (USA). 2—Kuraray active carbon (AC) and conductive carbon (CC) for supercapacitor electrode, Polyvinylidene fluoride (HSV 900 PVDF) binder for a Li-ion battery electrode were supplied by MTI.

Preparation of Solid Electrolyte and Electrode

Organic all solid flexible transparent and eco-friendly electrolytes were produced as follows. 0.27 g of LiNO$_3$ was dissolved in 4 mL of glycerol at 50° C. until a homogenous transparent gel mixture was obtained, then mixed with 1 g of agarose. The final mixture was casted on glass substrate and dried at 80° C. to obtain flexible sheet of electrolyte (GA-Li).

In addition, the gel electrolyte was prepared with two different weight ratios of ammonium molybdate (0.09 g and 0.18 g), and the samples were abbreviated as GA-Li—0.09Mo, GA-Li-0.18Mo, respectively.

The carbon hosting electrode slurry was made by mixing 80% (w/w) active carbon (AC), 10% (w/w) PVDF, and 10% (w/w) conductive carbon (CC) and homogenizing for 2 hours at 70° C. with steady stirring. Using an automatic coating equipment, the carbon-composites were then uniformly coated on an aluminum current collector (MRX Shenzhen Automation Equipment). A standard oven was used to dry the sheet at 70° C. and then they were cut it into suitable size of electrodes.

Characterization

Morphologies of the materials were investigated directly through Scanning Electron Microscopy (SEM) (TESCAN Vega 3), and Energy dispersive X-ray spectroscopy (EDX) measurements were carried out with an EDAX Thermal analysis of electrolytes was performed by thermal gravimetric analysis (TGA) (Perkin-Elmer thermal analyzer STA 6000). The temperature range was between 25 to 650° C. at a heating rate of 10° C. min$^{-1}$ under inert atmosphere with a flow rate of 10 ml min$^{-1}$. Cyclic voltammetry (CV) and galvanostatic charge-discharge (GCD) experiments were carried out using GA-Li AC-based symmetric supercapacitors. The supercapacitor devices were assembled into ITO-based a sandwich-type measurement system. Electrochemical measurements of the fabricated cells were obtained by using MTI 8 Channel Battery Analyzer (BST8MA). GCD analysis was done at different current ranging from 1 to 10 mA and cut off voltage was set between 0 to 2 V. The supercapacitor cell was then assessed at different scan rates ranging from 10 to 100 mV s$^{-1}$. Cyclic voltammetry (CV) of the devices was investigated by using CORRTEST Instrument (CS Multichannel Potentiostat).

The ion conductivity of the Agar/Gly/LiNO$_3$ based electrolytes were studied by Novocontrol dielectric-impedance analyzer with respect to Frequency (0.1 Hz to 3 MHz) and temperature. The thin films with a diameter of 5 mm and a thickness of around 100 μm were placed between platinum electrodes and their conductivities were measured under inert atmosphere. The DC conductivities ($\sigma_{dc}$) were derived from AC conductivity ($\sigma_{ac}$) and plotted with respect to temperature. Additionally, frequency dependent permittivity, electrical modulus and phase angle and capacitance plots are provided.

Figure 10A:
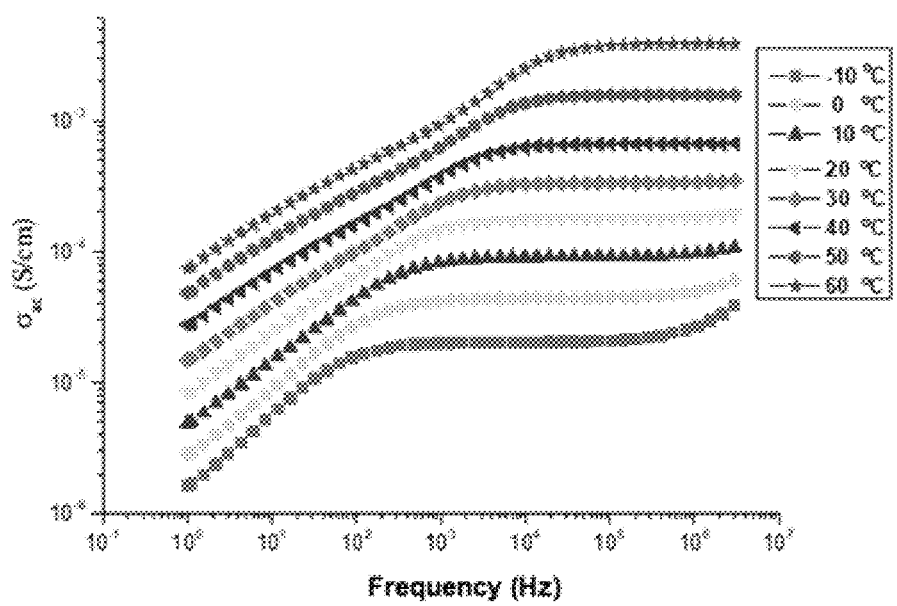
FIG. 10A shows plots of AC conductivity vs frequency at various temperatures for a biopolymer organogel electrolyte lacking the redox-active molybdenum-containing ions.

The AC conductivity, $\sigma_{ac}$ ($\sigma'(\omega)$), versus frequency at temperatures from −10 to 60° C. is illustrated in FIG. 10A. $\sigma_{ac}$ was calculated according to Equation 1 [N. Boaretto, et. al., J. Electrochem. Soc., 2020, 167, 070524; A. Bozkurt and T. Pakula, Chem. Phys. Lett., 2006, 422, 496-499; T. S. R. Tuan Naiwi, et. al., Polym. Test., 2022, 106, 107459; and S. Ozden, et. al., Electrochimica Acta., 2010, 55, 8498-8503, each of which is incorporated by reference herein in its entirety].

$$\sigma'(\omega)=\sigma_{ac}(\omega)=\varepsilon''(\omega)\omega\varepsilon_0 \qquad (1)$$

The real part of the conductivity is $\sigma'(\omega)$, angular frequency is $\omega=2\pi f$, vacuum permittivity ($\varepsilon_0=8.852\times10^{-14}$ F/cm) is so and imaginary part of the complex dielectric permittivity ($\varepsilon^*=\varepsilon'-i\varepsilon''$) is $\varepsilon''$. The curve includes frequency dependent conductivity lower frequencies domains due to electrode polarizations and frequency independent plateau regions (at intermediate or higher frequencies). The $\sigma_{de}$ corresponding to lithium ion conductivity of the biopolymer electrolytes was obtained from the $\sigma_{ae}$ data according to Equation 2 [H. Aydin, et. al., J. Power Sources., 2011, 196, 1425-1432, incorporated herein by reference in its entirety].

$$\sigma(\omega)=\sigma(0)+A\omega^n \qquad (2)$$

In Equation 2 $\sigma(0)=\sigma_{dc}$ and A, n are constants where $0<n<1.0$.

Figure 10B:
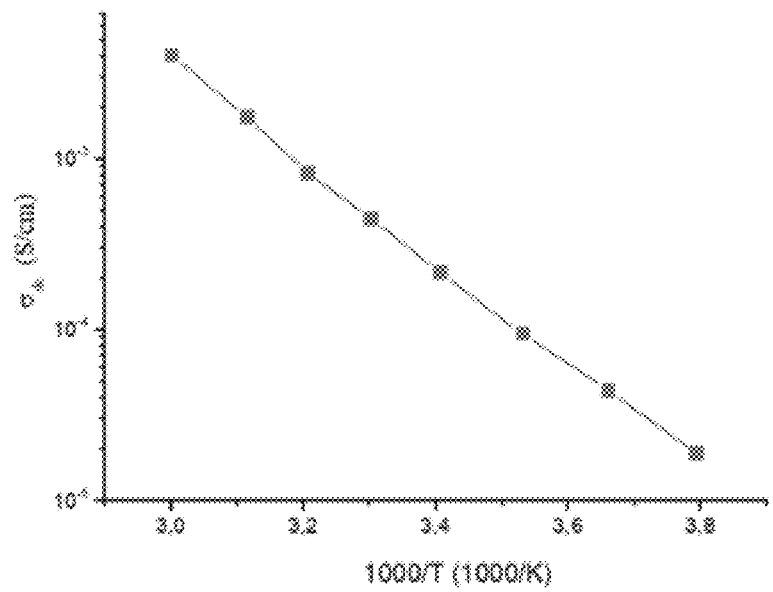
FIG. 10B shows a plot of DC conductivity vs 1000/temperature for a biopolymer organogel electrolyte lacking the redox-active molybdenum-containing ions.

FIG. 10B illustrates the DC conductivity ($\sigma_{dc}$) values of the Agar/GlyLiNO$_3$ as a function of temperature which can be interpreted with Arrhenius equation, Equation 3.

$$\ln \sigma=\ln \sigma_0-E_a/kT \qquad (3)$$

In Eq. 3 $\sigma_0$, $E_a$ and k are the pre-exponential term, activation energy and the Boltzmann constant, respectively. Clearly, the Li$^+$ ion conductivity increased linearly with temperature with an Ea of 0.22 eV. The lower activation energy value is a proof of concept for faster ion migration in with a lower energy. Various scenarios exist for the ion diffusion within the solid polymer electrolyte. Arrhenius temperature dependence of ion conductivity indicated the ion mobility throughout the Gly phase in the Agar. Although agar is swollen with Gly and Li$^+$ ion diffusion is not coordinated by polymer segmental relaxations but it is expected to occur within the Gly filled micro/nanochannels of Agar with a thermally activated process.

Figure 10C:
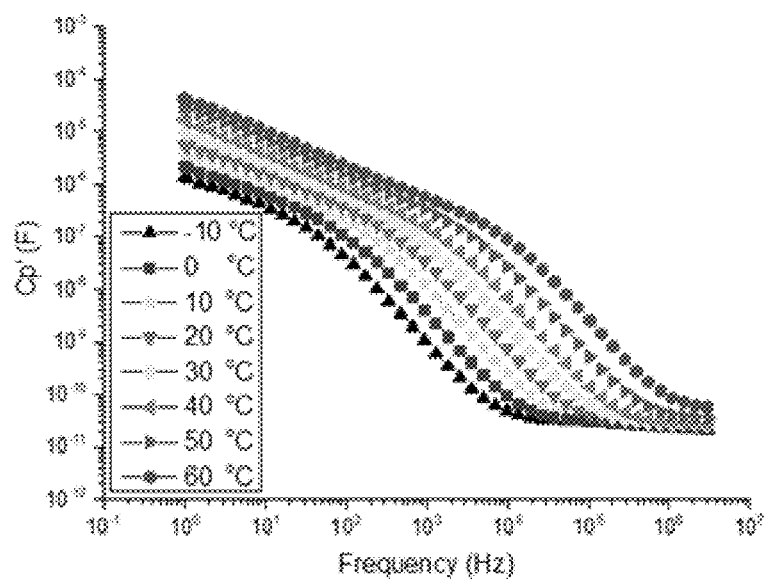
FIG. 10C shows plots of the real part of complex capacitance vs frequency at various temperatures for a biopolymer organogel electrolyte lacking the redox-active molybdenum-containing ions.

Ion diffusion kinetics was also investigated via real part of complex capacitance (C') which as plotted as a function of temperature and frequency (FIG. 10C). The frequency dependent capacitance demonstrates the ion dynamics between electrodes where ion penetration and storage on the electrode surface via EDLC. Clearly, at lower frequency C'(w) increases and but it becomes independent of frequency at very high frequencies (>$10^6$ Hz), behaving like an insulator [A. Kumar and A. Paul, ACS Omega, 2017, 2, 8039-8050, incorporated herein by reference in its entirety].

Figure 10D:
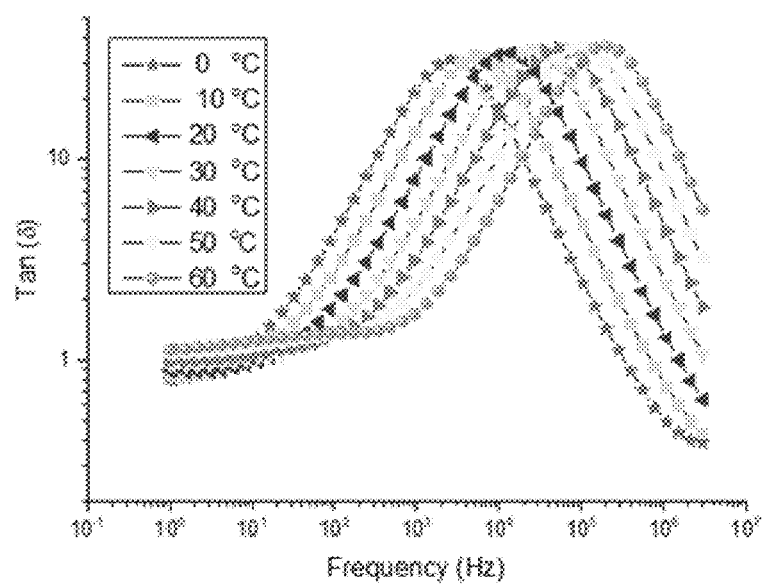
FIG. 10D shows plots dielectric loss (Tan (6)) vs frequency at various temperatures for a biopolymer organogel electrolyte lacking the redox-active molybdenum-containing ions.

FIG. 10D is the graph of dielectric loss (Tan (6)) versus frequency illustrating the conductivity relaxation times (i) at various temperatures. The relaxation time can be obtained from the maximum of plots at every temperature shifted from $2.9 \times 10^3$ to $2 \times 10^6$ s from $-10°$ C. to $60°$ C. Higher relaxation time even at lower temperatures can imply faster ion transport that become more feasible at higher temperatures.

Numerous modifications and variations of the present invention are possible in light of the above teachings. It is therefore to be understood that within the scope of the appended claims, the invention may be practiced otherwise than as specifically described herein.

The invention claimed is:

1. A flexible energy storage device, comprising:
a pair of electrodes separated by a redox-active biopolymer organogel electrolyte, the redox-active biopolymer organogel electrolyte comprising:
a biopolymer organogel comprising a biopolymer gelator and a gel solvent;
redox-active molybdenum-containing ions; and
a secondary ionic substance which is at least one selected from the group consisting of a lithium salt and a sodium salt,
wherein the flexible energy storage device retains greater than 75% of an unbent energy storage capacity when bent at an angle of 10 to 170°,
wherein the biopolymer gelator is agarose,
wherein the biopolymer gelator is present in the biopolymer organogel in an amount of 7.5 to 40 wt. %, based on a total weight of biopolymer organogel,
wherein the gel solvent is glycerol,
wherein the redox-active molybdenum-containing ions are molybdate anions,
wherein the redox-active molybdenum-containing ions are present in an amount of 0.1 to 15.0 wt. %, based on a total weight of the redox-active biopolymer organogel electrolyte, and
wherein the secondary ionic substance is present in an amount of 1.0 to 20.0 wt. %, based on a total weight of redox-active biopolymer organogel electrolyte.

2. The flexible energy storage device of claim 1, wherein the glycerol is present in an amount of 50 to 97.5 wt %, based on a total weight of biopolymer organogel.

3. The flexible energy storage device of claim 1, wherein the redox-active biopolymer organogel electrolyte has a DC conductivity (opc) of $5.00 \times 10^{-5}$ to $1.00 \times 10^{-3}$ Scm$^{-1}$ at a temperature of 10 to 30° C.

4. The flexible energy storage device of claim 1, wherein the redox-active biopolymer organogel electrolyte has an AC conductivity of $2.00 \times 10^{-5}$ to $6.50 \times 10^{-4}$ Scm$^{-1}$ at a frequency of $10^3$ to $10^6$ Hz and a temperature of 10 to 30° C.

5. The flexible energy storage device of claim 1, wherein the redox-active biopolymer organogel electrolyte has a maximum dielectric loss at a frequency of $5.00 \times 10^4$ to $5.00 \times 10^4$ Hz at a temperature of 10 to 30° C.

6. The flexible energy storage device of claim 1, wherein one or both of the electrodes are carbon electrodes.

7. The flexible energy storage device of claim 1, which is capable of being twisted and/or bent to an angle of 0 to 180° without breaking, tearing, or ripping at a temperature of −40 to 120° C.

8. The flexible energy storage device of claim 1, wherein the biopolymer gelator is present in the biopolymer organogel in an amount of 7.5 to 30 wt. %, based on the total weight of biopolymer organogel.

9. The flexible energy storage device of claim 8, wherein the biopolymer gelator is present in the biopolymer organogel in an amount of 7.5 to 25 wt. %, based on the total weight of biopolymer organogel.

10. The flexible energy storage device of claim 9, wherein the biopolymer gelator is present in the biopolymer organogel in an amount of 7.5 to 20 wt. %, based on the total weight of biopolymer organogel.

11. A method of forming the flexible energy storage device of claim 1, the method comprising:
mixing the biopolymer gelator, gel solvent, redox-active molybdenum-containing ions, and secondary ionic substance to form the redox-active biopolymer organogel electrolyte;
disposing the redox-active biopolymer organogel electrolyte on a first electrode such that the redox-active biopolymer organogel electrolyte forms a uniform film covering an entirety of a top surface of the first electrode; and
placing onto the redox-active biopolymer organogel electrolyte a second electrode such that the second electrode is separated from the first electrode by the redox-active biopolymer organogel electrolyte to form the flexible energy storage device.

12. The method of claim 11, wherein the first electrode, the second electrode, or both, are carbon electrodes prepared by uniformly depositing on a metal support a film comprising activated carbon, conductive carbon, and a binder such that an entirety of a top surface of the metal support is individually covered by the film to form a carbon electrode.

* * * * *